US012604014B2

(12) United States Patent
Shen et al.

(10) Patent No.: US 12,604,014 B2
(45) Date of Patent: Apr. 14, 2026

(54) METHOD AND SYSTEM OF VIDEO PROCESSING WITH LOW LATENCY BITSTREAM DISTRIBUTION

(71) Applicant: Intel Corporation, Santa Clara, CA (US)

(72) Inventors: Gang Shen, Hillsboro, OR (US); Guangxin Xu, Shanghai (CN); Jianhua Wu, Maoming (CN); Ce Wang, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 18/842,323

(22) PCT Filed: Apr. 1, 2022

(86) PCT No.: PCT/CN2022/084761
§ 371 (c)(1),
(2) Date: Aug. 28, 2024

(87) PCT Pub. No.: WO2023/184467
PCT Pub. Date: Oct. 5, 2023

(65) Prior Publication Data
US 2025/0184501 A1     Jun. 5, 2025

(51) Int. Cl.
*H04N 19/177* (2014.01)
*H04N 19/105* (2014.01)
*H04N 19/159* (2014.01)
*H04N 19/33* (2014.01)
*H04N 19/593* (2014.01)

(52) U.S. Cl.
CPC ......... *H04N 19/177* (2014.11); *H04N 19/105* (2014.11); *H04N 19/159* (2014.11); *H04N 19/33* (2014.11); *H04N 19/593* (2014.11)

(58) Field of Classification Search
CPC .. H04N 19/177; H04N 19/105; H04N 19/159; H04N 19/33; H04N 19/593; H04N 19/58; H04N 19/597
See application file for complete search history.

(56) References Cited

U.S. PATENT DOCUMENTS

2006/0133770 A1 * 6/2006 Shibata ................ H04N 9/8042
386/E5.052
2010/0166079 A1     7/2010 Goel
(Continued)

FOREIGN PATENT DOCUMENTS

CN     112040234 A     12/2020
CN     113498606 A     10/2021
(Continued)

OTHER PUBLICATIONS

International Searching Authority, "International Preliminary Report on Patentability," issued in connection with International Patent Application No. PCT/CN2022/084761, mailed on Oct. 10, 2024, 5 pages.
(Continued)

*Primary Examiner* — Richard T Torrente
(74) *Attorney, Agent, or Firm* — Hanley, Flight & Zimmerman, LLC

(57) ABSTRACT

Methods, systems, mediums, and devices use video processing with low latency bitstream distribution.

17 Claims, 9 Drawing Sheets

(56) References Cited

U.S. PATENT DOCUMENTS

| | | | |
|---|---|---|---|
| 2013/0156098 A1 | 6/2013 | Schwartz et al. | |
| 2015/0281705 A1* | 10/2015 | Wang ................... | H04N 19/172 |
| | | | 375/240.03 |
| 2017/0347084 A1 | 11/2017 | Boyce | |
| 2020/0394181 A1* | 12/2020 | Winarski ............ | G06F 16/2255 |

FOREIGN PATENT DOCUMENTS

| | | |
|---|---|---|
| CN | 113875246 A | 12/2021 |
| WO | 2021007702 A1 | 1/2021 |

OTHER PUBLICATIONS

International Searching Authority, "International Search Report," issued in connection with International Patent Application No. PCT/CN2022/084761, mailed on Nov. 25, 2022, 3 pages.

International Searching Authority, "Written Opinion of the International Searching Authority," issued in connection with International Patent Application No. PCT/CN2022/084761, mailed on Nov. 25, 2022, 3 pages.

Rivaz et al., "AV1 Bitstream & Decoding Process Specification," The Alliance for Open Media, retrieved from https://aomediacodec.github.io/av1-spec/av1-spec.pdf, Jan. 8, 2019, 681 pages.

Huawei Technologies Co., Ltd, "Virtual Reality/Augmented Reality White Paper," China Academy of Information and Communications Technology, Dec. 2017, 38 pages.

Choi et al., "WD on ISO/IEC 23000-20 Omnidirectional Media Application Format," International Organisation for Standardisation Organisation Internationale De Normalisation ISO/IEC JTC1/SC29/WG11 Coding of Moving Pictures and Audio, Jan. 13, 2014, 42 pages. (draft version).

Intel Corporation, "open.intel," retrieved from https://www.intel.com/content/www/us/en/developer/topic-technology/open/overview.html on Aug. 22, 2024, 7 pages.

* cited by examiner

Figure 2:
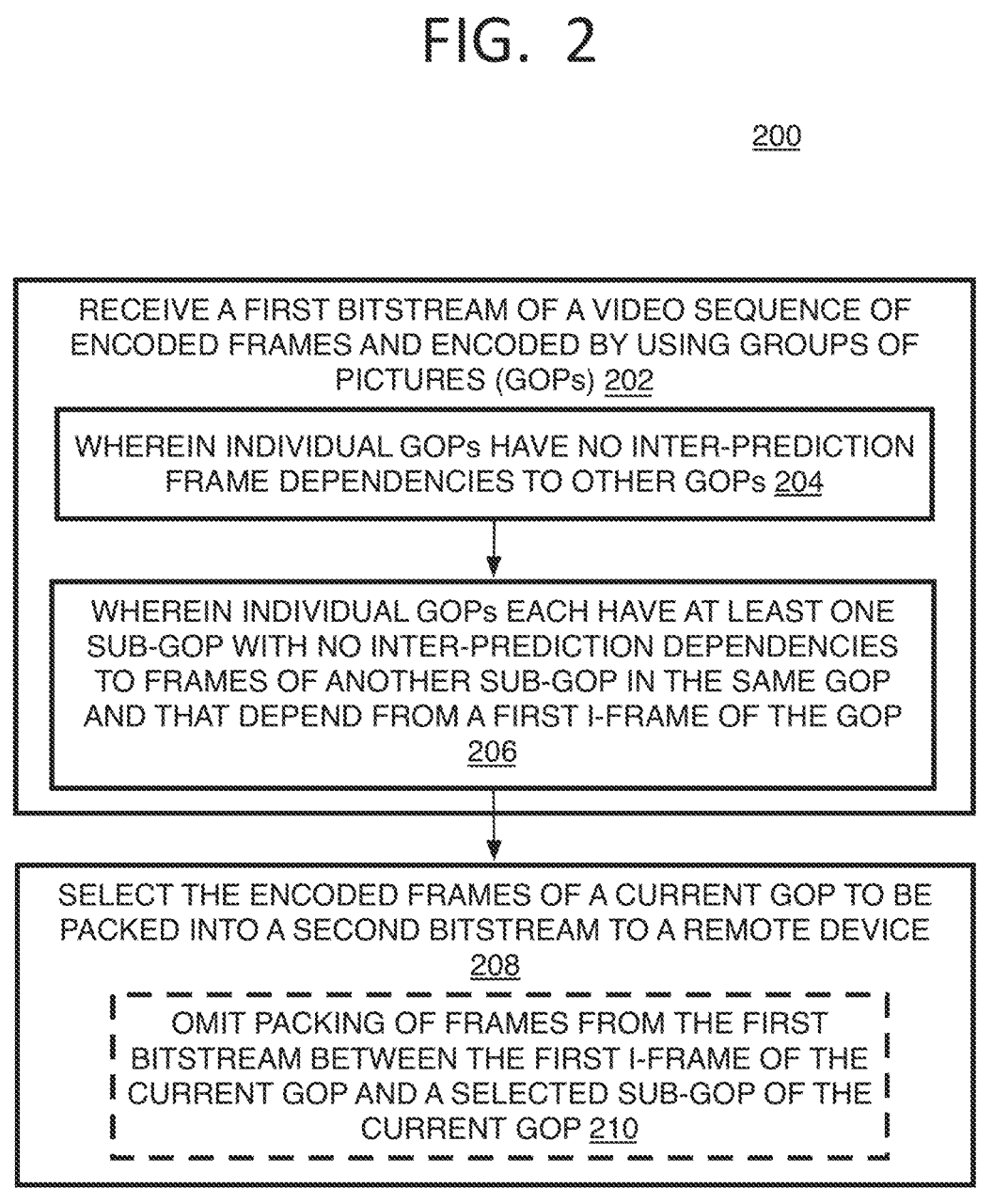

RECEIVE A FIRST BITSTREAM OF A VIDEO SEQUENCE OF ENCODED FRAMES AND ENCODED BY USING GROUPS OF PICTURES (GOPs) 202

WHEREIN INDIVIDUAL GOPs HAVE NO INTER-PREDICTION FRAME DEPENDENCIES TO OTHER GOPs 204

WHEREIN INDIVIDUAL GOPs EACH HAVE AT LEAST ONE SUB-GOP WITH NO INTER-PREDICTION DEPENDENCIES TO FRAMES OF ANOTHER SUB-GOP IN THE SAME GOP AND THAT DEPEND FROM A FIRST I-FRAME OF THE GOP 206

SELECT THE ENCODED FRAMES OF A CURRENT GOP TO BE PACKED INTO A SECOND BITSTREAM TO A REMOTE DEVICE 208

OMIT PACKING OF FRAMES FROM THE FIRST BITSTREAM BETWEEN THE FIRST I-FRAME OF THE CURRENT GOP AND A SELECTED SUB-GOP OF THE CURRENT GOP 210

Figures 3, 4:
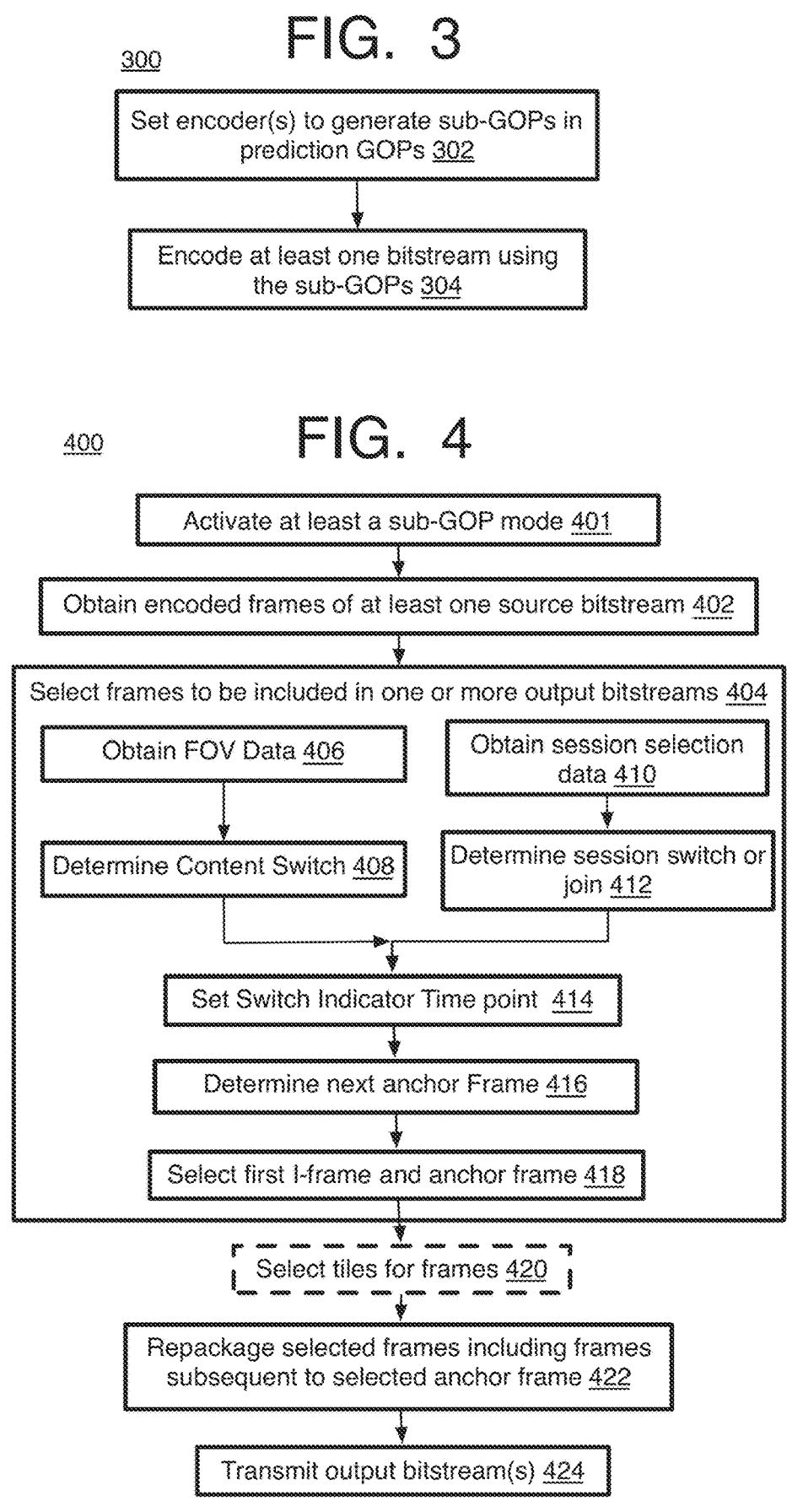

| Set encoder(s) to generate sub-GOPs in prediction GOPs 302 |

↓

| Encode at least one bitstream using the sub-GOPs 304 |

| Activate at least a sub-GOP mode 401 |

↓

| Obtain encoded frames of at least one source bitstream 402 |

↓

Select frames to be included in one or more output bitstreams 404

| Obtain FOV Data 406 |          | Obtain session selection data 410 |

↓                                ↓

| Determine Content Switch 408 |  | Determine session switch or join 412 |

↓

| Set Switch Indicator Time point 414 |

↓

| Determine next anchor Frame 416 |

↓

| Select first I-frame and anchor frame 418 |

↓

| Select tiles for frames 420 |

↓

| Repackage selected frames including frames subsequent to selected anchor frame 422 |

↓

| Transmit output bitstream(s) 424 |

METHOD AND SYSTEM OF VIDEO PROCESSING WITH LOW LATENCY BITSTREAM DISTRIBUTION

RELATED APPLICATION(S)

This application corresponds to the U.S. national phase of International Patent Application No. PCT/CN2022/084761, which was filed on Apr. 1, 2022. Priority to International Patent Application No. PCT/CN2022/084761 is claimed. International Patent Application No. PCT/CN2022/084761 is incorporated herein by reference in its entirety.

BACKGROUND

With increasingly high image resolutions, virtual reality (VR) or augmented reality (AR), such as with 8K or 12K planar video or 360-degree VR or AR video in gaming, simulation, or conferencing domains, the demands to reduce image transmission bandwidths also increased. The full images are often too large to transmit and often result in blurred, misplaced, or outdated content. Other image processing systems have similar difficulties such as with cable, television, and/or online video streaming services for example. To avoid these difficulties during image processing, at least with interactive viewport VR or AR systems, one or more servers typically transmit field of view (FOV) of images, rather than the full images, to a client device such as a head mount display (HMD) to display the FOV on a viewport of the HMD. The viewport-dependent streaming in these systems rely on the interactivity between a client and the server. The client provides an FOV position and orientation to the server, and the server responds with the region of interest content for the given FOV. This interactivity needs to be accomplished within a very short time to provide a smooth viewport switching experience while the viewport on the HMD moves, and in turn changes views. The interactive systems, however, still cause latencies detectable by a user.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of an example method of image processing with low latency bitstream distribution according to at least one of the implementations herein;

FIG. 3 is a flow chart of another example method of image processing with low latency bitstream distribution according to at least one of the implementations herein;

FIG. 4 is a flow chart of yet another example method of image processing with low latency bitstream distribution according to at least one of the implementations herein;

DETAILED DESCRIPTION

Figure 1A:
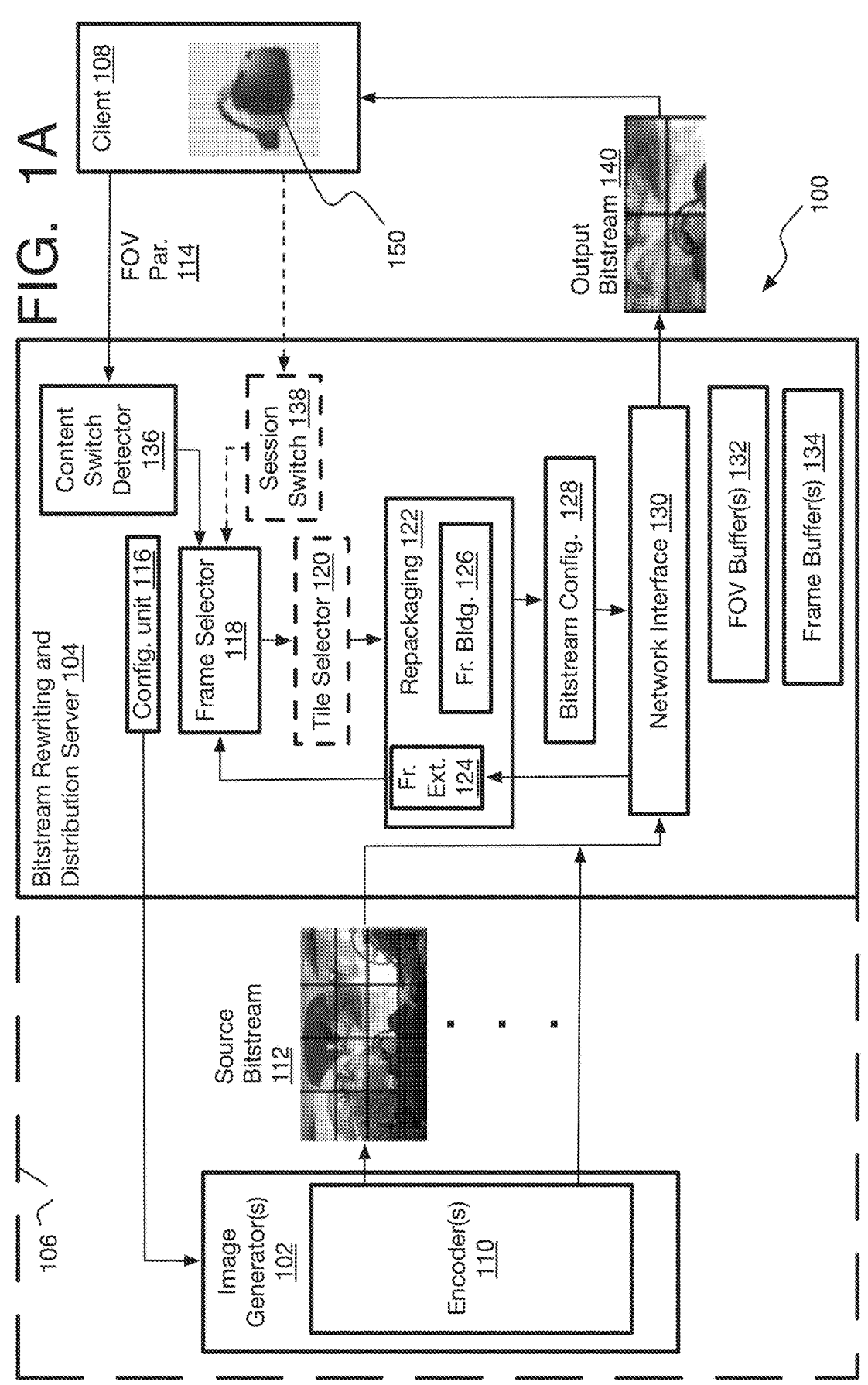
FIG. 1A is a schematic diagram of an image processing system for content switches according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various commercial or consumer computing devices and/or electronic devices such as clients, local, internet, or cloud servers, gaming engines, game consoles, set top boxes, smart phones, tablets, laptops, desktops, televisions, computers, mobile gaming devices, virtual, augmented, or modified reality headsets or head mounted displays (HMDs), and so forth, may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as DRAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, systems, computing platforms, mediums, and articles described herein are related to video processing with low latency bitstream distribution.

The conventional viewport-dependent streaming systems produce an interactive latency between server and client devices due to a number of reasons. As far as latency caused by server processing time, the server processing time is largely determined by the size of a group of pictures (GOPs) used by the encoder that compresses the images. The encoder operates according to a codec that provides frame types to take advantage of redundancy of image content in video sequence of frames. By one form, each GOP starts with an I-frame or instantaneous decoder refresh (IDR) frame. An IDR frame (or large part of a frame such as a slice) clears the contents of a reference frame picture buffer at an encoder or decoder when the I-frame is received at the buffer. The remainder of the GOP is filled with P-frames, and some GOPs may use B-frames. The I-frames only reference image data within the frame itself, referred to as spatial-prediction, while the P-frames and B-frames are used for inter-prediction or temporal dependency that uses other frames as reference frames. The P-frames reference to one or more previous frames in the GOP while B-frames can reference to either one or more previous frames in the GOP, one or more subsequent frames in the GOP, or both.

The size of the GOP is the amount of frames in the GOP. The more frames in the GOP, the larger the latency caused by the temporal dependency during bitstream rewriting of real-time streaming video when a large change in view takes place, such as a relatively large and fast movement of the viewport or a user changes videos from one stream to another stream. Specifically, for each new viewport change, a server must wait until a next I-frame to make the content ready for the field of view (FOV) of the client device, such as a head mounted display (HMD) for VR or AR. The system must wait for the next I-frame due to the inter-dependency among frames in a GOP. The conventional systems cannot provide a new bitstream in the middle of a GOP since too much reference frame image data will be missing for the new frames in the new bitstream.

The timing is measured from the presence of an IDR frame, for example. For a GOP size of 30 frames in a 30 fps video stream and the conventional systems, the average waiting time for an IDR frame is 1000 ms/2=500 ms (half the duration of the GOP), which is the minimum duration for a server processing time. Usually, the GOP size is much more than 30 frames for a better compression ratio in live broadcasting.

The same or similar difficulty exists with channel or session switch latency (or session startup latency) where a user may be switching broadcast or streaming bitstreams of different games provided by a game console, HMD, or other gaming device. Similarly, the same GOP size difficulty exists with switching between videos on TV, cable, satellite, and/or online video streaming services, especially in large-scale real-time live broadcasting. Thus, image processing such as 2D video transmissions have a similar difficulty. For example, with live broadcast streaming (such as news, sports, movies, or TV series broadcasting) where the input is 2D images rather than 3D projections to 2D, the GOP size can cause a delay of 10 seconds or even up to 10 minutes. When a new client tunes into a new channel or session in the middle of a GOP, the display on the client must wait for the next GOP to start decoding or rendering of the bitstream of the new channel.

The interactive latency should be reduced because delayed or misplaced views (or frames) can be easily detected by users when content for a new FOV cannot be constructed and transmitted in time. The interactive latency is required at 25 ms to give users completely immersive experiences, where most VR products in the market have this interactive latency at 300-400 ms.

Attempts to reduce this interactive latency also are varied. One attempt transmits a region with a margin around the content of an FOV so that multiple different FOVs can be selected within the region. However, this arrangement is very limited and usually only can cover slow or small viewport changes within the region.

Another such attempt is provided in the codec standard often used for 360 degree image-based viewport-dependent streaming referred to as moving picture experts group I (MPEG-I) omni-directional media format (OMAF). MPEG-I OMAF provides multi-bitrate or multi-resolution packing, region-wise packing, and tile-based coding to create FOVs at different tracks. The MPEG-I OMAF reduces interactive latency by adding encoding tracks (or layers) of different GOP sizes, and which greatly increases bitrate (or cost for image signal processors (ISPs) performing the encoding) due to increased use of I-frames and complexity of the encoding process.

In other attempts, the encoder itself is modified to use small GOP sizes when viewport images change from frame to frame thereby decreasing the number of frames between I-frames, but maintain large GOP sizes when no change occurs along the video sequence. This, however, still will cause the bitrate to increase even when the viewport is not changing.

Other attempts use multiple separate bitstreams where low-resolution is used for full view and high-resolution is used for content in the FOV. The high-resolution stream provide region-wise packing (RWPK) and encoding before sending the bitstream out to clients. The high-resolution streams may have different GOP sizes where long GOP sizes are used when a viewport is not changing significantly, and short GOP sizes when the viewport is changing. The drawback is the huge amount of encoding computations needed and complex switching logic.

Other methods have been explored by using scalable video coding (SVC), which allows enhancement layers of different qualities with one bitstream and saves bandwidth by having dependency between layers and region-based packing for each enhancement layer of a frame. This still does not resolve the temporal dependency delay issues of the large GOPs.

One other solution, discussed below, has a multi-layer structure with a base layer that provides downscaled full frames and an enhancement layer of tiles that form the FOV. The latency is reduced because no inter-dependency is permitted between enhancement layers of different frames. This somewhat reduces the interactive latency but is still insufficient alone.

The above solutions can mitigate the severity of the temporal dependency in video encoding usually by increasing the cost of bandwidth or using redundant data. But in all of those cases, the server still must wait for the start of a GOP (an I-frame) to make a viewport switch so that the content can be decodable.

As a result, even with the use of the viewport-based transmissions, a distribution edge server that provides the image data to the HMD usually still does not have memory capacity and computation capacity to perform real-time transcoding for multiple sessions due to the latencies. The latencies also result in high complexity and costs to perform an interactive exchange such that real-time transcoding at the distribution edge is usually impractical for large scale of distribution of a video.

To resolve these issues, the disclosed systems and methods of bitstream distribution, including viewport-dependent video streaming, encode the videos by using GOP structures at the encoder that enable a reduction in streaming latency for a client to join or switch to a different bitstream with a different session to reduce startup latency or with different image content thereby reducing interactive latency. This is accomplished by setting one or more sub-GOPs that each start with an anchor frame where a single GOP can have multiple sub-GOPs. The anchor frame is other-than an I-frame and may be a P-frame. By one alternative, a bitstream rewriting server (or distribution server) receives a source bitstream of encoded frames of full images using the sub-GOPs and repackages the frames to only transmit viewport (or field of view (FOV)) images. When the viewport image content changes significantly, or when a user at the client joins a session or changes sessions entirely (such as switching channels on a display device whether related to a game for a viewport or another type of display device), the server may start constructing the output bitstream by packaging a first I-frame of a GOP and then the next available anchor frame after receiving a switch indicator of the content or session switch (or session joining). The I-frame and a selected anchor frame are the first two frames of the output bitstream to be sent to the client device. The frames between the I-frame and anchor frame are omitted in the output bitstream. By one form, the I-frame is only used as a reference for the anchor frame and the anchor frame is to be the first frame to be displayed for the output bitstream. Since the anchor frame is handled before the I-frame in a next GOP, and often a relatively large amount of time before the next GOP, this significantly reduces delay in constructing and transmitting the output bitstream, especially when the GOP has many frames such as 300 frames for 360-degree live streaming (where typically a GOP has a duration of 5 seconds and frames per second is set at 60).

By one example, this structure can be implemented with AV1 SVC codec specification and other codecs, such as versatile video coding (VVC), without significant changes in the bitstream's internal structure. Otherwise, the methods herein can be applied to ultra-high resolution video hypertext transfer protocol (HTTP) adaptive bitrate (ABR)

streaming such as MPEG dynamic adaptive streaming over HTTP (e.g., MPEG-DASH) and so forth. Regarding interactive latency, this system and method applies to immersive and 360 degree video viewport streaming, VR, AR, or MR video, as well as "pan" and "zoom" operations, and any other system that uses viewports. It also will be appreciated that the systems and methods herein can be used with any display for 2D video broadcasting as well. The methods and system are implemented by using a video coding structure and a set of server and client processes which can reduce the temporal dependency to the minimum and provide the fastest possible viewport switch solution for 360-degree video viewport-dependent streaming, which is in a single frame as described below.

Figure 1B:
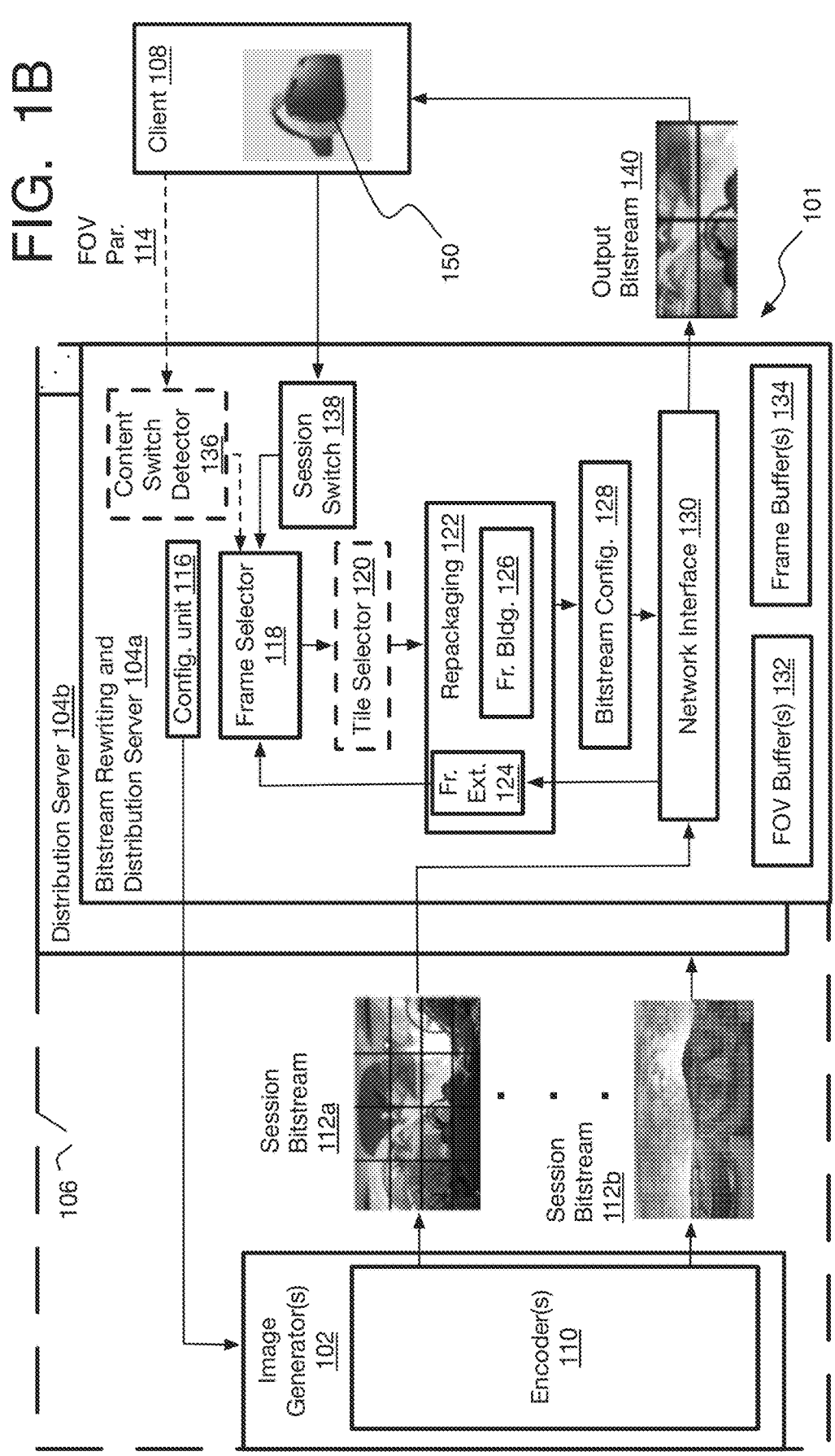
FIG. 1B is a schematic diagram of an image processing system for both content and session switches according to at least one of the implementations herein.

Referring to FIGS. 1A and 1B, an image processing system or device 100 (FIG. 1A) performs a viewport-dependent distribution process to deliver immersive video in a time-sensitive (e.g., low latency) manner. For clarity, an image processing system 101 (FIG. 1B) is largely provided for session switches and the reduction of the startup latency but also may have capability to provide viewport or content switching as well. The two systems 100 and 101 have much of the same components that are described below for either system.

The example viewport-based image processing system 100 may include one or more image generators (or media providers) 102 and one or more bitstream rewriting and distribution servers 104. By one form, the image generators 102 are media provider servers remote from the distribution server 104 such as being remote over a computer network such as the internet, but also may be within a single internet or media server 106 that both generates images and distributes images, such as viewport-based images, to one or more client devices 108, or a combination of both of these may exist where one or more generators 102 are remote and one or more generators 102 are local.

The image generators 102 have one or more encoders (or encoder circuitry) 110 to compress the generated images which are then packed into a source bitstream and transmitted to the distribution server 104. The encoder 110 encodes media, such as example immersive video, requested by the example client device 108. In this example, the image generator 102 includes and/or stores a plurality of media. In some examples, media may be immersive video. Additionally and/or alternatively, media may be any type of audio and/or video requested by the client device 108.

In this example, a source bitstream 112 may be a sequence of bits generated by encoding (e.g., projecting, packing, and encoding) a sequence of frames corresponding to an entire 360 degree view. The example encoder 110 may implement a MPEG-I OMAF standard to encode media, such as immersive video. Additionally and/or alternatively, the encoder 110 may utilize any type of video coding standard to encode media. In some examples, the encoder 110 obtains configuration instructions from the server 104 indicative of how to encode immersive video. For example, the encoder 110 may be configured to encode immersive video such that the encoded immersive video (e.g., the source bitstream 112) can be efficiently processed and rewritten by the server 104 that is implementing low latency viewport-dependent streaming.

The server 104 may receive full content images from source bitstreams 112 and may select the content within the source bitstreams 112 according to FOV parameter data 114 received from the client device 108. The server 104 then may rewrite the source bitstreams 112 using the selected content. In some examples, the server 104 generates new output bitstreams 140 indicative of a FOV of the immersive video by using the selected content.

It will be appreciated that the server can handle many different types of media. By one form, the source bitstream 112 provides gaming or simulation images, such as for 360 degree or immersive video such as with VR, AR, and/or MR. In these cases, the client may be or have a head mounted display (HMD) 150 to display the video from the source bitstream 112. Also in these cases, the distribution server 104 may rewrite the source bitstream 112 by only using tiles from the source bitstream 112 that are to be used to form a desired FOV requested by the client device 114. This also may include switching image content when a significant change in the viewport image occurs such that the server 104 is effectively starting a new output bitstream and the viewport or content switch latency in doing so is to be reduced as much as possible by the systems and methods disclosed herein. This may occur when a camera providing the images to the encoder moves significantly or which camera is providing the images to the encoder is changed on a multi-camera system. This is referred to herein as content (or viewport) switching.

The distribution server 104 may have a configuration unit (or circuitry) 116, a switch frame selector unit (or circuitry or just frame selector) 118, a tile selector unit (or circuitry) 120, a repackaging unit (or circuitry) 122 with a frame extractor unit (or circuitry) 124 and a frame building unit (or circuitry) 126, a bitstream configuration unit (or circuitry) 128, a network interface (or circuitry) 130, FOV buffer(s) 132, frame buffer(s) 134, and a content switch detector (or circuitry) 136. A session switch unit (or circuitry) 138 is shown in dashed line to indicate that the distribution server 104 could also be used to handle session switches which is described in detail below.

Figures 5, 6:
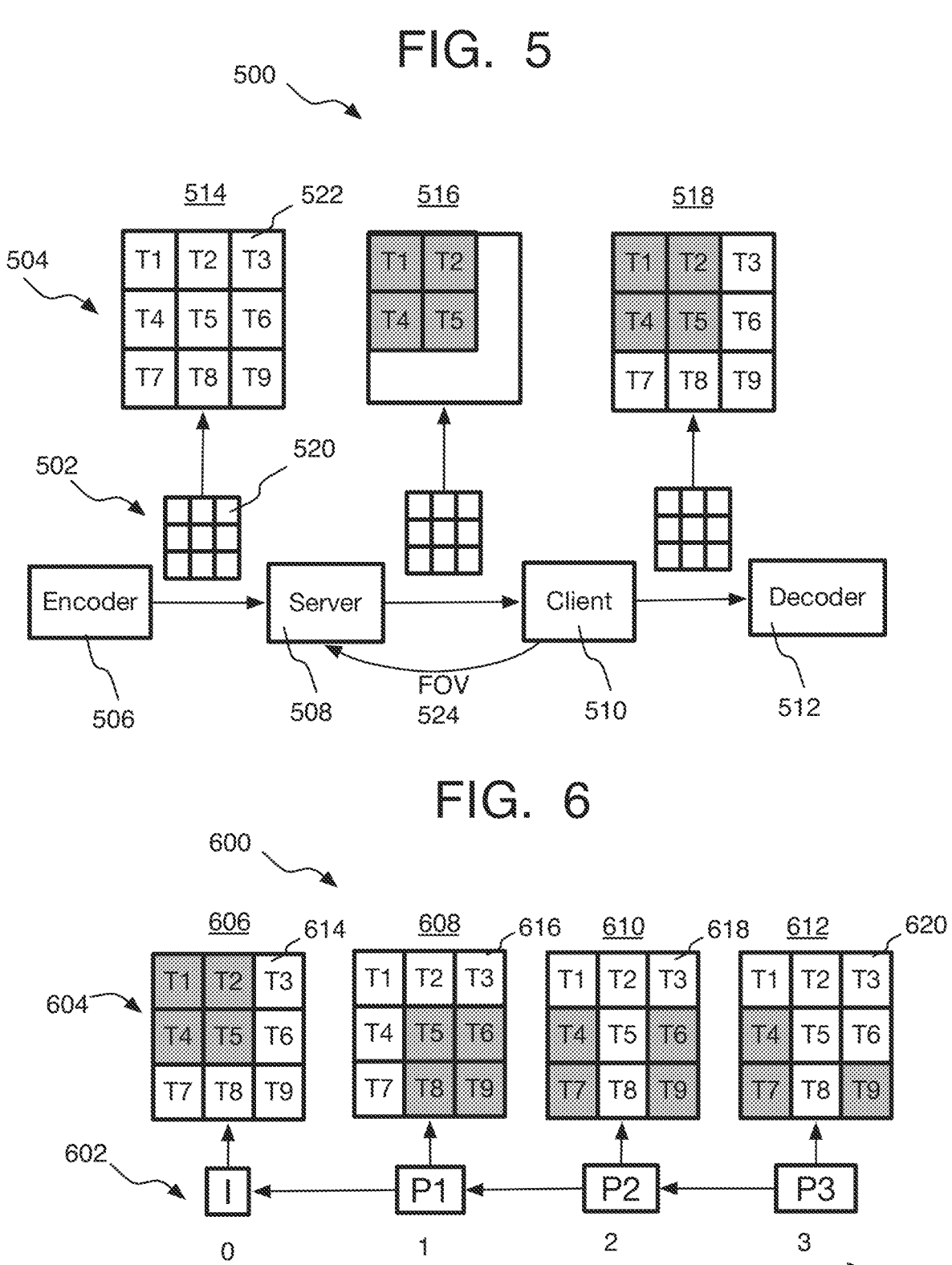
FIG. 5 is a schematic diagram of an example multi-layer frame structure of an example bitstream used with at least one of the implementations herein.
FIG. 6 is a schematic diagram of an example tile-modifying frame structure of an example bitstream used with at least one of the implementations herein.

For one example for the viewport-based transmissions, the configuration unit 116 may generate instructions, such as configuration instructions, provided to the encoder 110 to indicate how to process and encode immersive video. The configuration unit 116 may generate instructions that are to configure the encoder to encode projected pictures as groups of tiles when tiles are used to form the frames. By one example used herein, a frame structure may have multiple resolutions at multiple enhanced layers used for SVC for example. Also in this example, the tiles also may be used to form a multiple layer frame structure where a base layer may be a downscaled version of the full frame and the enhanced layer(s) have the full resolution images. The details for this example are provided below (FIGS. 5 and 6). The images or frames may be segmented into rows and columns of tiles and these may be transmitted together to form the full image or frame.

In some examples, the configuration unit 116 provides instructions to encoder 110 via the interface 130. For example, the configuration unit 116 may be communicatively coupled to the interface 130 via a bus. Therefore, the example configuration unit 116 can inform the example interface 130 to package the instructions (e.g., generate a data packet, network packet, etc.) and transmit them to the encoder 110. In some examples, the configuration unit 116 transmits the instructions in response to a request to utilize viewport-dependent streaming. For example, the interface 130 initializes the configuration unit 116 to generate instructions responsive to a notification from a client device 108 that a user wants to stream immersive video.

By one form, the example interface 130 communicates information from encoder 100 and/or client device 108. The interface 130 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. The interface 130 may obtain requests to utilize viewport-dependent streaming, transmit configuration instructions, obtain bitstreams, transmit bitstreams, obtain FOV parameters, and so forth. In some examples, the interface 130 stores communication information in respective buffers (e.g., field of view buffer 132 and/or frame buffer 134). The buffers 132 and 134 may be any number, type, and format to efficiently perform the operations mentioned herein.

The content (or viewport) switch detector (or circuitry) 136 may determine that a viewport or content switch has occurred in a number of different ways, which is not particularly limited here. For example, this may be determined by receiving a switch indicator or signal from the HMD. The switch indicator may be generated externally at the client device 108 by the HMD's own tracking of the motion of the HMD. When the HMD translates and/or rotates a certain amount, the HMD may compute a substantial change in the viewport display such that the current full 3D image being provided to the client device (or HMD) can provide images with the new position or orientation of the HMD. Otherwise, either the HMD itself or the content switch detector 136 may determine or receive 3D global video frame coordinates represented by the full image of a frame being analyzed, and/or 2D coordinates representing the outer boundary of the full image and projected from the 3D global video frame coordinates of a previous frame. These previous frame coordinates then may be compared to the image coordinates provided by a current frame that is extracted from the source bitstream. The 3D coordinates, 2D coordinates, or both may be provided in the header of the frames, metadata accompanying the frames in the source bitstream, and so forth. Otherwise, the global image coordinates of the frame may be converted into parameters to compare directly to FOV parameters 114. from the client device 108. By another option, the client device 108 may convert the FOV parameters into global coordinates to be provided to the content switch detector 136 and for the content switch comparison. By one form, if the FOV parameters do not position the FOV entirely within a current full frame, then this is considered a content switch. Once the content switch is detected, a switch indicator or signal is provided to, or set at, the frame selector 118. Other methods to detect the content switch could be used here.

When the frame selector 118 has no switch indicators from the content switch detector unit 136, processing at the distribution server 104 proceeds with usual operations described herein to convert fully encoded images into FOV viewport-based images (at least at the enhanced layers when used) for transmission to the client device 108. Otherwise, the frame selector 118 receives the content switch indicator. The duration from (a) the time the switch indicator is received or generated (a switch indicator time (or time point) X) and to (b) the time the indicator time X is compared to the time (or clock) of frames being received from a desired source bitstream is relatively instantaneous, and compared to the time between consecutive frame time points. Thus, the indicator time X may be set by the frame selector 118 determining the status of the source bitstream. This may include determining which frame is being received and/or extracted from the source bitstream and where along the time line or clock of the source bitstream the frame selector is performing the comparison. The frame selector 118 then determines which frame along a video sequence being streamed (where along refers to an amount of time on the frame time line or count of frames in the sequence) is to be the first couple of frames to start a new output bitstream to transmit the data of the desired source bitstream to the client device 108. Upon receiving the switch indicator, the frame selector 118 stops the repackaging (or just transmitting) of more frames of the previous output bitstream that was being handled for the particular client being handled. If the system is already in the middle of placing a frame into the previous output bitstream (now undesired content), that frame may be packed and transmitted to the particular client.

Also, the frame selector 118 may obtain the picture type status of the target or desired content stream. As mentioned, the GOP structure may have GOPs that individually have at least one sub-GOP that starts with a non-I-frame, such as a P-frame, that is referred to as an anchor frame. The frame selector 118 identifies the next anchor frame by either looking up the frame labels in received frame headers or metadata, or by using a time count of frames in the video sequence or GOP where anchors may be provided at every nth fraction of a second (or other time) depending on the fps used with the frames. While the switch indicator time point may be relative to the frames of the relevant source bitstream as the frames are received or extracted from the source bitstream to be worked on, it otherwise may be set at any time before the frames are repackaged. Alternatively, the switch indicator time point could be compared to the frames later after repackaging as long as omitted frames or frame layers still can be dropped before the frames are placed into the output bitstream. The frame selector 118 then applies a frame selection algorithm, described below, to determine which sub-GOP and anchor frame is to be used to start the new output bitstream. As explained below, this will depend on whether the indicator time point X is before an upcoming anchor frame, during the processing of, or at the same time as, an anchor frame, or before or during the processing of a last sub-GOP in a current GOP. Processing here refers to the frame being repackaged or later in the server pipeline.

Once the frames are identified for a content switch, or when no switch is occurring, the tile sector unit 120 may be used when viewport-based images are supported. The tile selector unit 120 may identify tiles in a group of tiles that correspond to a FOV for a current frame being analyzed. The example tile selector unit 120 may use the FOV parameters 114 to identify which tiles to extract and use for generating the output bitstream 140. For example, the tile selector unit 120 may identify a mapping from FOV parameters to a list of tiles which are within a viewer's FOV. In some examples, such as 360 degree video, the FOV parameters are indicative of yaw, pitch, and roll angles. In such an example, the tile selector unit 120 maps the angles to a two-dimensional plane (e.g., a 2D ERP, a CubeMap plane, etc.). The yaw, pitch, and roll angles are to determine a region (e.g., a region of tiles) in a spherical surface representative of the 360 degree video, which is projected to the two-dimensional plane (e.g., 2D ERP, a CubeMap plane, etc.). The example tile selector unit 120 selects the tiles in the region indicative of the FOV. The tiles selected then may be extracted from the originating encoded frame. In some examples, the tile selector unit 120 uses syntax of a video coding structure (e.g., AV1 scalable video coding (SVC)) to extract the selected tiles. In some examples, the tile selector unit 120 separates the tiles, identified as being in the FOV, from the other tiles in the group of tiles corresponding to a whole frame (e.g., the whole 360 degree video frame), according to a video coding structure. For example, the tile selector unit 120 may mark and/or flag the tiles not in the FOV as "skipped" tiles, which refers to tiles that are not to be decoded. Otherwise, and additionally and/or alternatively, a repackaging unit 122 and/or the bitstream configuration unit 128 may mark the unselected tiles as tiles to be "skipped." The example tile selector unit 120 provides the selected tiles to the example repackaging unit 122.

The repackaging unit 122 may have the frame extractor 124 extract frames to identify the frames that need to be rebuilt or repackaged with FOV tiles. This may include reading the frame headers for identification of the frame and tiles. The frame identification may be passed to the frame selector 118. Tile identification may be passed to the tile selector 120. The frames may be extracted in a sequence, such as in coding order, and corresponding to the GOPs as encoded. When tiles are being used, the title selector 120 may provide the identification of the tiles to be packed and the frame that corresponds to the tile and to the repackaging unit 122. By one form, the selection of tiles by the tile selector unit 120 also identifies the frame of the tiles. Thus, if the repackaging unit 122 does not receive tiles of a certain frame, it can be assumed that frame (or enhancement layer) is skipped in a content switch to shorten the delay of transmitting the output bitstream. In this case, the repackaging unit 122 may simply omit the skipped frames for the client being handled and build the next frame that is provided with tiles from the tile selector unit 120, which will be an anchor frame if a switch is occurring. In cases where only a base layer of a frame is being transmitted rather than also the enhanced layers (as described below) with the tiles of that frame, such as with first I-frames when anchor frames are being used as described below, the repackaging unit then may receive a signal from the frame selector in that case to indicate the I-frame is still to be repackaged.

The repackaging unit 122 also may repackage the extracted tiles into new frames, and by one form, only the selected frames to begin a bitstream when a content switch is occurring, and where the selected frame may have a base layer frame or frame version and at least one enhanced (or enhancement) layer frame or frame version with different resolutions. By the example form, the enhancement layers will only have the selected tiles representative of the FOV. For example, the repackaging unit 122 may have the frame builder 126 to generate a new frame (or enhancement layer version of the frame) encoded at the higher resolution that includes only the FOV. In some examples, the repackaging unit 122 implements region-wise packing (RWP) to repackage the tiles selected by the tile selector unit 122. Additionally and/or alternatively, the example repackaging unit 122 may implement any type of algorithm and/or packing standard to repackage the selected tiles.

The bitstream configuration unit (or circuitry) 128 may generate an output bitstream 140 corresponding to a FOV and by using the frames repackaged by the repackaging unit 122. In some examples, the bitstream configuration unit 128 places the frames, or base and enhancement layer versions of the frames, into the correct order and into the output bitstream. By one form, this is performed in compliance with a video coding structure, such as AV1 SVC, to generate bitstreams. In order to maintain compliance with such a standard, tiles and/or frames may be packetized in Open Bitstream Units (OBUs) described in greater detail below.

The client device 108 may decode the output bitstream 140 from the distribution server 104. In this example, the client device 108 may be an extended reality headset or HMD. Additionally, and/or alternatively, the client device 108 may be a television, a smart phone, a computer (e.g., a laptop, desktop, tablet, etc.) and/or any type of computing device having the capabilities to stream and/or display immersive video. In some examples, the client device 108 also provide the FOV parameters 114 to the distribution server 104, and the FOV parameters 114 are subject to change based on the client device 108. The FOV parameters 114 may change due to user intentional selection of settings on a game or other applications providing the viewport or due to a user motion while wearing the client device 108 such as the HMD 150.

By one alternative example, when a FOV parameter changes more than a certain amount, a viewport or content switch is to occur. In some examples, the viewport or content switch occurs at the client device 108 instead of the distribution server 104. For example, the output bitstream 140 includes information that enables the client device 108 to decode a new FOV that was not originally used to generate the output bitstream 140. Thus, when the example client device 108 detects a viewport switch, the example client device 108 may use a low-resolution encoded image of a base layer in the output bitstream 140 to decode the new FOV of a new frame. In this manner, the client device 108 does not need to wait on the distribution server 104 to encode and transmit a new bitstream with the new FOV. By another alternative example though, the client device 108 no longer needs to use just the base to display a frame when a content switch has occurred and instead may rely on the distribution server's use of the sub-GOPs to shorten the delay of delivery of the output bitstream as described herein.

In operation, the encoder 110 may obtain a request and configuration instructions from the distribution server 104. The request may indicate media to stream to the client device 108 and the configuration instructions may indicate how to encode the media that is to be streamed to the client device 108 including inter-prediction dependency frame GOP structure including sub-GOPs as described herein. The encoder 110 encodes the media and packages the encoded media into a source bitstream 112. The source bitstream 112 may indicate a full 360 degree frame in the immersive video by one example. The encoder 110 transmits the source bitstream 112 to the distribution server 104.

The example distribution server 104 rewrites the source bitstream 112 into an output bitstream 140 that may indicate a viewport, region of interest (ROI) with multiple possible FOVs, and/or a FOV of the full 360 degree image. The distribution server 104 generates the output bitstream 140 based on FOV parameters 114 obtained from the client device 108. For example, the distribution server 104 extracts sections (e.g., tiles, isolated regions, etc.), indicative of the FOV parameters 114, from a high-resolution encoded image included in the source bitstream 112. In this example, the distribution server 104 associates a low-resolution encoded image, included in the source bitstream 112 and representative of the full 360 degree image, with the extracted sections of the high-resolution encoded image included in the source bitstream 112 to generate the output bitstream 140. The distribution server 104 transmits the output bitstream 140 to the client device 108. The client 108 may be able to determine tile positions and identification by using OBU headers when AV1 codec is being used as described below When a content switch occurs, the distribution server detects the content switch. The distribution server 104 then determines which frames to use to join the client to a bitstream of the new desired content. This is performed by using anchor frames of sub-GOPS in the GOPs provided by the source bitstreams in order to avoid waiting until a next GOP is available to be transmitted in the desired output bitstream to the client device 108, thereby reducing or eliminating a potentially annoying delay noticeable by a user at the client device 108.

Referring to FIG. 1B, and by an alternative or additional approach, the image processing system 101 may have multiple distribution servers 104a to 104b that each receive a different source session bitstream 112a to 112b respectively, and from the encoder(s) 110. Each source session bitstream 112a to 112b may be used to generate a different output bitstream 140 to provide one or more 2D videos whether for television, cable, satellite, online video streaming services, and whenever the bitstream is to be transmitted to one or more clients. These may be flat 2D videos without specifications for a viewport, but the reduced startup latency still is beneficial. By one form, one or more image generators 102 may be simultaneously providing multiple bitstreams 112a to 112b to the distribution server 104a. This may be used whenever a client is joining a channel or switching channels (or sessions) between games on a gaming system (whether via a game console, over the internet, and/or other location), among television channels, or between movies or TV series on an online streaming service, and so forth. This is referred to herein as session switching. It should be noted that in this case, the client device 108 still may have an HMD 150, but the actual device could be other than an HMD, such as any computing device that shows a display such as a TV, computer, tablet, smartphone, and so forth.

Each distribution server 104a to 104b may have the same components as server 104 for content switching except additionally or alternatively having a session switch unit 138. In the case of a session switch, the client device 108 may transmit a signal to join a session or switch from one session to another. The signal may have or be an identification of the session when the distribution server 104 handles multiple sessions simultaneously. The identifier may be in the form of a binary code with a different code for each session. The session switch unit (or circuitry) 138 receives the session switch signal and sends or sets a switch indicator at the frame selector 118 similar to the operation of the content switch detector 136. By one form, the detectors 136 and 138 may be a same single detector, or one of the detectors may be considered to be a part of the other detector. Other architecture or structure could be used instead such as multiple frame selectors with one for each session being provided as shown. Thereafter, the operation of the session switch servers 104a to 104b is the same or similar to that of the content switch server 104 except for handling of FOV parameters. The number of session switch servers is not limited and may be provided with one for every session stream handled. As noted, the content switch server 104 may be for a single session being handled with content or viewport switches within that single session, while the session switching capability could be added to the server 104, while the content switching capability could be added to the session switch servers 104a to 104b as shown by the content switch unit 136 in dashed line.

Referring to FIG. 2, an example process 200 for image processing with low latency bitstream distribution is arranged in accordance with at least some implementations of the present disclosure. Process 200 may include one or more operations 202-210 numbered evenly. By way of non-limiting example, process 200 may perform bitstream distribution as performed by any device, system, or unit as discussed herein such as system, device, or unit 100, 101, 900, and/or 1000 of FIGS. 1A-1B, 9, and/or 10 respectively, and where relevant.

Process 200 may include "receive a first bitstream of a video sequence of encoded frames and encoded by using groups of pictures (GOPs)" 202. The images forming the frames may be computer generated such as for VR games or simulations, or may be images captured by cameras, such as for AR or MR images. This may include frames for 360 degree images for immersive video, panoramic video, geometrically shaped video such as equirectangular projection (ERP), CubeMap projection (CMP), and so forth when interactive latency for viewport or content switching is being reduced. Also, flat 2D video may be used with this method when startup latency for session switching is to be reduced.

The encoded frames may have been encoded using the GOP and sub-GOP structures described herein. Thus, this operation may include "wherein individual GOPs have no inter-prediction frame dependencies to other GOPs" 204. By one form, each GOP starts with an I- or IDR frame. As to the sub-GOPs, this operation may include "wherein individual GOPs each have at least one sub-GOP with no inter-prediction dependencies to frames of another sub-GOP in the same GOP and that depend from a first I-frame of the GOP" 206. Thus, a single GOP may have multiple sub-GOPs that each depend form the first I-frame of the sub-GOP. In most cases, the GOP will have one I-frame, as the first frame in coding order, and by one form, is defined by having only one I-frame. Each sub-GOP may have an anchor frame as the first frame of the sub-GOP and is not an I-frame. The anchor frame may be a P-frame. The examples of sub-GOP structures are provided below (FIGS. 7-8) and include having an anchor frame as every other frame in a GOP to form 2-frame sub-GOPs. This can result in a mere single frame delay when switching to, or joining, a bitstream of new content or a new session.

Process 200 may include "select the encoded frames of a current GOP to be packed into a second bitstream to transmit the second bitstream to a remote device" 208. This operation includes determining the time of a switch indicator of a content switch or session switch (or joining a new session). As mentioned above, this may occur inherently simply as a time point along a time line of the source bitstream (or processing of the source bitstream) and when a frame selector is able to determine which frames are received or being extracted from a relevant source bitstream to be used to generate the desired output bitstream. This should occur before the frames are being rebuilt or repackaged but could happen as long as frames (or layers of a frame) can still be omitted when desired. The indicator time point is not limited to exact frame time points along the time line of the desired source bitstream and could be between frame time points.

According to a frame selecting algorithm, the current picture-type status of the received frames of the source bitstream may be used to determine which frames are to be used to build the new bitstream to be sent to the client device. The algorithm makes the following determinations. When a current anchor frame time point is exactly or close (such as within a +/−½ or ¼ time or clock count of the time line of the source bitstream for example) of the switch indicator time (or time point), the I-frame and then that anchor frame as well as the following frames in the sub-GOP of that anchor frame being packaged are to start the second or output bitstream to be transmitted to the client. When the repackaging is just before a last anchor frame in the current GOP or within the last sub-GOP of the current frame, then no anchor frame is sent and the system waits for the I-frame of the next GOP to be packaged instead since very little time delay should occur if only a single sub-GOP needs to be processed first before the next I-frame of the next GOP is reached. Otherwise, when the switch indicator time is between non-anchor frames or is otherwise before an anchor frame, then the I-frame of the current GOP and the next available anchor frame, and in turn a now selected sub-GOP of that available anchor frame, are to be packaged to start the new bitstream. The frames subsequent to the selected sub-GOP are then packaged as well.

This operation also may include "omit packing of frames from the first bitstream between the first I-frame of the current GOP and a selected sub-GOP of the current GOP" 210. This operation recites the effect of starting the output bitstream with the I-frame of the current GOP and immediately thereafter an anchor frame, which reduces the delay that could be caused by waiting for the next GOP for the content or session switch (or session joining) instead. By dividing the GOP into isolated sub-GOPs that do not depend from each other, the same first I-frame can be used with any of the sub-GOPs in the GOP and the inter-prediction pattern is controlled so that any sub-GOP can be the start of a new bitstream after the first I-frame. It should be noted, however, that by one form, the first I-frame is placed in the output bitstream only to be used as a reference frame for the anchor frame while decoding the output bitstream at the client device. The I-frame adds unnecessarily to the computational load and reduces the bitstream if transmitted to be displayed. This use of the first I-frame only as a reference frame can be accomplished by transmitting only a full frame lower resolution (or downscaled) base layer of the I-frame when the entire I-frame also includes one or more enhancement layers with higher resolutions and that have detail unnecessary for use of the I-frame as a reference frame. In this case then, the display of the video of the second or output bitstream at the client device starts with an anchor frame (or P-frame) instead of an I-frame. The first I-frames of the GOPs each may be held in a frame buffer while that I-frame's GOP is being repackaged in case that I-frame is needed to be a reference frame for an anchor frame in the same GOP.

Referring to FIG. 3, an example process 300 for image processing with low latency bitstream distribution is arranged in accordance with at least some implementations of the present disclosure. Process 300 may include one or more operations 302-304 numbered evenly. By way of non-limiting example, process 300 may perform bitstream distribution as performed by any device, system, or unit as discussed herein such as system, device, or unit 100, 101, 900, and/or 1000 of FIGS. 1A-1B, 9, and/or 10 respectively, and where relevant.

Process 300 may include "set encoder(s) to generate sub-GOPs in prediction GOPs" 302. For this operation, the encoder syntax is set to construct GOPs with sub-GOPs where each sub-GOP depends from the first frame of the GOP and that may be an I-frame (referred to herein as the first I-frame). By one form, the frames subsequent to the first I-frame and that depend directly or indirectly from that I-frame until the next I-frame forms a GOP. The syntax of the encoder may be set at the supplemental enhancement information (SEI) network abstraction layer (NAL) unit for the encoding of the bitstreams using high efficiency video coding (HEVC) or in OBU headers for AV1, and may set the GOP size, order, and type of frames as well as the inter-prediction dependencies. This includes setting encoder syntax for the sub-GOP structures mentioned herein. By one form, these encoder syntax values are transmitted to the encoder (or encoders) by the configuration unit of the distribution server.

Referring to FIG. 5, other frame dependency structures may be used to further decrease the interactive latency to add to the latency reduction due to use of the sub-GOPs, and these structures also need the encoder to be set at certain syntax settings. Thus, an alternative example frame coding structure 500 may be used here that generates viewport-based transmissions to a client device and prioritizes reduction of inter-prediction dependencies to reduce interactive latency. Such a structure and system are disclosed by Shen et al., International Patent Application No.: PCT/CN2021/122510, filed Oct. 6, 2021, which is incorporated herein for all purposes. The frame coding structure 500 is at least partly based on SVC and tiling.

Specifically, frame coding structure 500 has two layers: a low-resolution or low-quality base layer 502 and at least one high-resolution enhanced layer 504. Multiple enhanced layers with different resolutions or bitrates may be used such as with Simulcast. Each frame 514 may be formed at an encoder 506 to be placed in a bitstream to the server 508. The frame 514 may be formed of the base layer (or a base layer frame or frame version) 520 and at last one enhanced layer (or enhanced layer frame or frame version) 522 for each base layer frame 520.

The encoder 506 encodes both the base frame 520 and enhanced frame 522 with tiling to divide the full content into small regions, where the tiles are numbered T1 to T9 on both the base and enhanced layers (although only numbered on the enhanced layer 522). The output frame 514 is to be provided to the distribution server 508.

The server 508 will receive the full content frames 514 as well as viewport information (FOV parameters) 524 from a client device 510. The server 508 may apply tile selection and repackaging (bitstream rewriting) on the full content frames 514 according to the FOV parameters 524, and this may be provided from each of multiple clients 510. The tile selection of a particular FOV may be a mapped from the viewport or FOV parameters 524 to a list of tiles which are within a viewer's FOV, and then used to construct the enhanced layer to be sent to the client, and for each frame. Thus, for the example, tiles T1, T2, T4, and T5 are found to form an FOV based on FOV parameters 524 from the client device 510. Then, the server 508 may extract those tiles and repackage them into a new frame 516 with only those tiles forming the FOV in the enhanced layer 504. All tiles in the base layer are maintained from the full frame 514 and to be placed in a new bitstream to the client. Alternatively, it should be noted that the base layer frames each or individually only may have a single tile and/or single slice to reduce the processing bitrate.

Referring to FIG. 6, the frame coding structure 500 also enables random FOV-based tile selection for transmission of only the enhanced layer tiles that form the FOV to the client no matter where the tile is located within the full frame 522. Random here refers to patterns that are not predetermined in contrast to predetermined patterns being limited to rectangular blocks of tiles within the full frame. A frame structure 600 is used to demonstrate these features and is the same as frame coding structure 500. Specifically, frame structure 600 has a base layer 602 and an enhancement layer 604 as described above with frame coding structure 500. The frames are spaced along a time line with time points numbered 0 to 3.

The base layer 602 is shown with an IPPP GOP where the frames are labeled I and P1 to P3. The base layer 602 has inter-prediction or temporal dependency from frame to frame in the base layer. Shown here, each base layer frame has a dependency on the base layer frame before it within the same GOP. However, frames in the base layer 602 may have temporal dependency on multiple previous based layer frames or any previous based layer frame in the same GOP. For example, frame P3 in the base layer may have dependencies on frame P1 and/or P2 in the base layer. Note that low latency B-frames also could be used.

Frames 614, 616, 618, and 620 in the enhanced layer 604 may have spatial dependency to its base layer frame and to any prior base layer frame in the same GOP. However, no temporal dependency exists between frames in the enhanced layer 604 in order to reduce delays. For example, the dependency between the enhanced layer frame 616 at time 1 and its base layer frame P1 is on the same frame 608. In addition, frames in the enhanced layer also may have dependency on base layer frames previous to its own base layer. Thus, frame 616 may depend from the base layer frame I in addition to its own base layer frame P1, but cannot directly depend from the enhanced layer frame 614 of frame 606 at time 0. Likewise, enhanced layer frame 618 of frame 610 may have dependencies in frame I, P1, or P2 in the base layer 602. By one form, the dependency of the enhanced layer frame 618 to the base layer frame could be to only its own base layer (such as frame P2) and the adjacent previous base layer frame P1.

When streaming from the distribution server and to a client device, by one form, only content (shaded tiles) within the given FOV in the enhanced layer 604 and all tiles of the full image or frame in the base layer 602 will be transmitted to the client device. For example, tiles T1, T2, T4, and T5 are requested to form an FOV and from the enhanced layer of frame 606 and in time 0. The FOV changes from time 0 to 1, and now a new FOV is to be formed by tiles T5, T6, T8, and T9. Since tile T5 was already obtained and packaged in frame 606 at time 0, tile T5 can be decoded by depending from base layer frame I which was already used to construct tile T5 on the enhanced layer frame 614 of frame 606.

By one feature, random accesses for content in the enhanced layer to perform any viewport changes within the same full image can be achieved both spatially and temporally. This is particularly useful for a number of 3D image projection formats for immersive media that require the use of non-adjacent (or non-contiguous) tiles to form the content of an FOV. This is particularly useful for 3D or geometrical formats that do not result in a usual flat 2D display including equirectangular projection (ERP) or 360-degree video where the video projection results in an unequal distribution of pixels for the viewports. By another example, 360-degree video in Cube Map projection format has content for a given FOV that may be scattered in multiple unconnected regions in a full frame. For example here, projecting content onto a 3D cube for a given user viewport orientation results in projection to different regions in a 2D rectangular surface according to Cube Map projection in MPEG-I OMAF.

This makes region-wise packing into a 2D rectangular surface extremely difficult. Thus, the disclosed example optional structure has a way to simplify this operation. For example, enhanced layer frame 618 of time 2 shows that the divided content for a new FOV includes nonadjacent tiles T4, T6, T7, and T9. Likewise, enhanced layer frame 620 has both a different quantity of tiles and a different tile pattern to form the FOV compared to the FOV of time 2. Here, tiles T4, T7, and T9 are selected to form the FOV. Only these tiles, even though non-adjacent to each other, may be transmitted as the only tiles needed to form their respective FOVs, and in turn the enhancement layer.

The frame coding structure may be implemented adjusting known codec standards that can be set at the distribution server and sent in the output bitstream to the client to enable the random FOV-based tile selection by the client. Particularly, in AV1 SVC standards, the structure can be built upon L2T1, with additional tile specifications. Thus, the frame coding structure 500 and 600 described above can be accomplished by setting tile position and selection, and frame dependency, in SEI messages in HEVC or other header formats such as OBU headers in AV1, and for each frame. According to AV1 SVC, multiple Tile Group OBUs can be applied on those tiles and in this case, each Tile Group OBU will cover one and only one tile. Since every tile is inside one Tile Group OBU and the Tile Group OBU has no other tiles, the tile's position may be identified by using tabs such as "tg_start" and "tg_end" values in OBU. These can be provided in the second or output bitstream to the client.

After the repackaging of selected tiles, a temporal delimiter OBU should be applied which will identify the boundary between frames. The tiles outside of the FOV are skipped. Once the client receives all high-resolution tile groups to be used to form an FOV, the client can generate unselected and unreceived tiles as "skipped" tiles (shown as non-shaded tiles on the enhanced layer of frame 518 (FIG. 5) for example). Thus, even if an FOV change occurs and the distribution server cannot use the sub-GOPs, such as when a sub-GOP mode is turned off, the skipped tiles can still be reconstructed. This can be achieved, and by one form by using the following settings. First, at a frame-level, cumulative distribution function (CDF) updates may be set to being disabled and a global MV (Motion Vector) is set to zero. At a tile level, the transform skip param setting may be set to true, and "use global MV" may be set to true. According to the AV1 SVC specification then, those generated "skipped" tiles are still decodable at the client device 510/512. After decoding, the regions of skipped tiles in the enhanced layers may be filled by taking and scaling up the counterparts from the base layer. There is no change needed at the decoder.

With the frame structure 500 and 600, and in addition to the benefits of the sub-GOPs, the coding structure (two layers, tiling, and across-layer spatial dependency only) eliminates or reduces the temporal dependency in enhanced layers (high quality content). This makes it possible to switch to any tiles in the enhanced layer at any time. The process of tile selection and repackaging on the distribution server ensures only the high-quality content within a FOV will be transported. Therefore, it saves a great amount of bandwidth for the last-mile (last transmission) and for edge networks.

This solution also reduces end-to-end latency. When the FOV changes, other conventional solutions need to change the encoder to modify the high-quality area (or FOV area) to be encoded. This is a transcoding delay, which is usually costly in time and resources. The disclosed system and method here use bitstream rewriting which is applied to the already encoded frames. Thus, no transcoding delay exists. Also, the bitstream rewriting is a lightweight operation, which allows the server to support many clients simultaneously. In addition, no change is needed on current AV1 decoders (or decoders of any other appropriate codecs).

Process 300 then may include "encode at least one bitstream using the sub-GOPs" 304. Here, the received or generated video sequences may be encoded by using the encoder syntax and headers described above, including the layer structure with a base layer and at least one enhancement layer, and sub-GOPs described above. The additional features of frame coding structures 500 and 600 may be used when desired such as the elimination of inter-dependency directly between enhancement layer frames and the random tile selection in the enhancement layer to further reduce interactive latency. The encoded frames are packed into a bitstream and transmitted to the distribution server.

Referring to FIG. 4, an example process 400 for image processing with low latency bitstream distribution is arranged in accordance with at least some implementations of the present disclosure. Process 400 may include one or more operations 401-424 generally numbered evenly. By way of non-limiting example, process 400 may perform bitstream distribution as performed by any device, system, or unit as discussed herein such as system, device, or unit 100, 101, 900, and/or 1000 of FIGS. 1A-1B, 9, and/or 10 respectively, and where relevant.

Process 400 may include "activate at least a sub-GOP mode" 401. For this operation, the system may activate the use of sub-GOPs at the encoder by providing the appropriate syntax as discussed above, and from the distribution server, or configuration unit. The request for this mode may originate at the client or the distribution server. This may be automatic upon sensing interactive latency, or other factors such as bitrate, is above a threshold. Otherwise, the sub-GOP mode may be turned on manually by a user at the client requesting a high performance mode for example. A mode for tile selection and frame dependencies as described with frame coding structures 500 and 600 may be selected similarly or may be included in a same low latency mode with the sub-GOPs.

Process 400 may include "obtain encoded frames of at least one source bitstream" 402, and as described above with operation 202 in process 200 (FIG. 2). The encoded frames may include the frame structures mentioned above in process 300 with at least two layers including a base layer and enhanced layer divided into tiles with each frame. The encoding may be performed with sub-GOPs as mentioned, but also optionally with the frame dependency setup as disclosed by frame coding structures 500 and 600. Also, the content of the source bitstream(s) may be viewport-based that require content or viewport switches, or may be video images that each establish a different session while a user may manually request a switch between sessions as described above with systems 100 and 101

Process 400 may include "select frames to be included in one or more output bitstreams" 404. This operation may refer to the processing by the distribution server to use the sub-GOPs during a content (viewport) or session switch (or join). With regard to viewport-based bitstreams, this operation first may include "obtain FOV data" 406. The FOV data may be provided as explained above with 3D FOV orientation and position data that is relative to a scene in the image content, or may be calculated image data coordinates for the new FOV, such as two diagonally opposite corners of the FOV by one possible example.

This operation then may include "determine content switch" 408. Here a content or viewport switch may be detected by HMD motion detection circuitry, comparison of image coordinates by using 3D coordinates or 2D coordinates projected form the 3D coordinates or a 3D model, or any other technique for detecting content switches as describe above for the content switch detector 134 (FIG. 1A).

Once a content switch is detected, the frame selecting operation 404 may include "set switch indicator time point" 414, and by one form, this may be set as the time point after a frame is received or extracted from the relevant source bitstream to be used to generate the desired output bitstream, but it could be later as described above. The switch indicator time point also may be set along a time line or clock associated with the frames being received from the source bitstream and potentially to be placed into the desired output bitstream. This can be any time point along that time line including between frame time points. Thus, the switch indicator time point may be determined relative to a clock used to control the bitstream repackaging timing and frame time line as well when the time lines the same or synched. Whether using a time line or clock, or simply setting the time point as frames are received and extracted, this may be considered as setting the switch indicator time point depending on a status of the frames of the source bitstream to be used to generate the output bitstream to the requesting client (or client being worked on). Thus, the switch indicator time point may be an inherent time point that defines when the frame selector determines which frame of the source bitstream is received and/or extracted for rewriting (or repackaging) to be analyzed by the distribution server for placement in an output bitstream.

Alternatively, or additionally, this operation may include "obtain session selection data" 410. Here, instructions are received to switch to, or join a session. Such a session would be available from the distribution server and already being transmitted as a general broadcast to be available for other or all clients. The operations then may include "determine session switch or join" 412, where the instructions are read, and by one form, a code may be received for a specific session. Assuming a client is found to have authorization to join a session, the distribution server can then switch or join the client to the desired session. The frame time of the session switch indicator is then set as described with operation 414 above.

Figure 7:
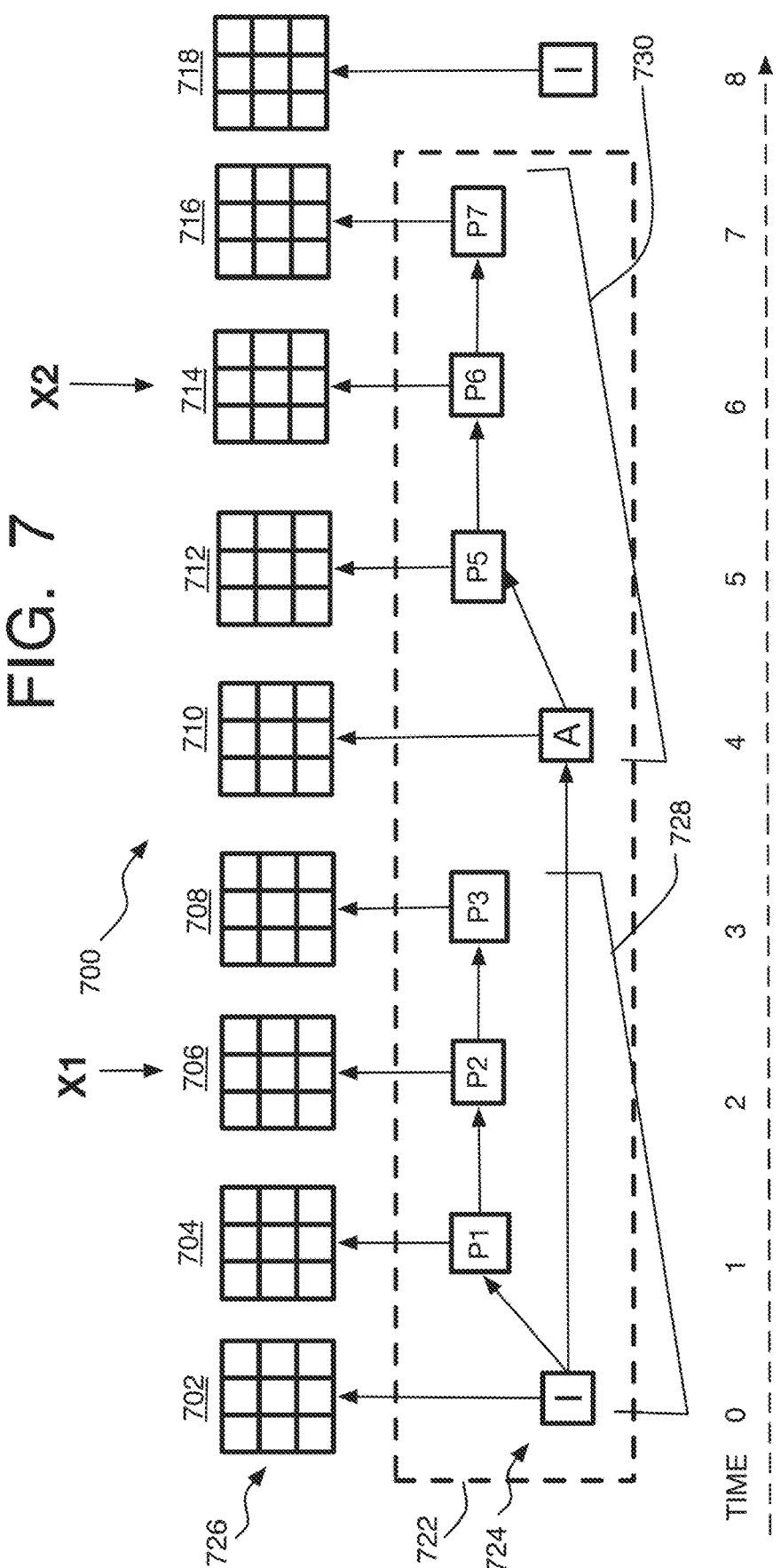
FIG. 7 is a schematic diagram of an example group of picture (GOP)-size-modifying frame structure of an example bitstream used with at least one of the implementations herein.

Referring to FIG. 7, the frame selection operation 404 then may include "determine next anchor frame" 416. This involves determining which anchor frame to use so that a content switch and/or session startup latency can be reduced by using the anchor frames. By one example form, a frame structure 700 has anchor frames 'A' in a base layer 722. Specifically, the frame structure 700 includes the base layer 722 and an enhancement layer 726 where each frame has a layer (or frame or frame version) on both layers. The anchor frame selection does not require any change to an enhanced layer and/or cross-layer dependencies as provided by the encoder. For example, the frame structure 700 shows a GOP 724 of eight frames 702 to 716 numbered evenly along a timeline showing frame time points 0 to 7, and one anchor frame A at frame 710 in the base layer 722. An additional I-frame 718 at time point 8 is the start of a next GOP. The structure 700 is shown with a start sub-group 728 and one sub-GOP 730 thereafter that are constructed so that the start sub-group 728 starts with an I-frame and has frames 702 to 708 (P1 to P3) of time points 0, 1, 2, 3, and a sub-GOP 730 starts with the anchor frame A and includes frames P5 to P7 at time points 4, 5, 6, and 7. The I frame at time 0 also may or may not be considered part of the sub-group 730. To be consistent herein, a sub-GOP along a frame structure time line (or frame order) can only be started by an anchor frame that is not an I-frame.

The anchor frame should have the following characteristics: (1) the anchor frame is a non-I-frame, such as a P-frame, with dependency only to the IDR frame of the GOP it is within. (2) The frames following a given anchor frame cannot have direct dependencies in any frames previous to the anchor frame. For example, frame P5, P6, and P7 in the base layer 722 cannot have direct dependencies on any of frames I, P1, P2, and P3. (3) Particular to multi-layered structure, the frames in the enhanced layer 726 cannot have dependencies on base layer frames previous to the anchor frame of the same sub-GOP. For example, the enhanced layer frames of frames 710, 712, 714, and 716 cannot have dependency on the base layer frames I, P1, P2, and P3 of the start sub-group 728.

The anchor frames cannot be IDR-frames so that the compression ratio (bitrate) of the anchor frame can be much less than an IDR frame and can still be the second frame after a previous I-frame to start a new session bitstream to a particular client, and can be the first frame to be displayed by the client. Typically for the disclosed method, the first I-frame is only placed in the bitstream to be used as a reference frame for the anchor frame and is not displayed in order to reduce the computational load and lower the bitrate for the bitstream. Thus, by one form, when a two layer frame structure is being used, only the low resolution or low quality base layer of the I-frame need be transmitted for use as a reference frame for an anchor frame. High resolution or high quality enhancement layer of the I-frame is not transmitted in the output bitstream for the client being work on.

Thus, anchor frames can be used to segment a long GOP into several sub-GOPs, and by one form, equal size sub-GOPs, although the sub-GOPs could vary in size if desired. For example, if a system is already providing different size GOPs depending on whether or not a switch is present, then the sub-GOPs may have different sizes as well, even though this may increase the complexity of the encoder settings. As mentioned, no cross sub-GOP dependency can exist where frames in the enhanced or base layers depend from frames in other sub-GOPs, except for the anchor frame of each sub-GOP in a GOP depending from the first I-frame of the same GOP.

To select the anchor frame then, an algorithm is provided below and to be used when an indicator of a channel switch or a client joining a session occurs, or a content switch occurs. The switch indicator is determined to be at a switch indicator time point X.

If X is within the last "sub-GOP" AND not an anchor frame,

THEN skip the last GOP and transmit the next IDR frame of the next GOP,

ELSE IF X is an Anchor frame,      (1)

THEN transmit current IDR and current Anchor frame at X,

ELSE transmit current IDF and next anchor frame

Thus, say a switch indicator in a live session in GOP 724 is at the frame time X1 as shown on structure 700 at a non-anchor frame 706 time point. Also, the time point X1 is before the sub-GOP 730. Thus, the server will send frame 0 (the I-frame) and then the second frame is the next available anchor frame A at time point 4 (frame 710) that starts sub-GOP 730. As a result, the client will be able to start to decode and render the A frame at time point 4. If a time point X2 is within the sub-GOP 730, the server will wait to send the I-frame 718, which is the first frame of the next GOP instead.

The following chart shows effective reduction in GOP size and in turn delay:

| Client joins at time X | Session startup latency (W/out Anchor Frame & Sub-GOP) | Session startup latency (With Anchor frame & Sub-GOP in FIG. 8) |
|---|---|---|
| 0 | 0 | 0 |
| 1 | 7 | 3 |
| 2 | 6 | 2 |
| 3 | 5 | 1 |
| 4 | 4 | 0 |
| 5 | 3 | 3 |
| 6 | 2 | 2 |
| 7 | 1 | 1 |
| 8 | 0 | 0 |
| Average: | 4 (frame intervals) | 2 (frame intervals) |

With the anchor frames and sub-GOPs in structure 700, the average session startup latency can be lowered 50%, and the maximum session startup latency is three frame intervals rather than seven frame intervals without using sub-GOPs described herein.

Figure 8:
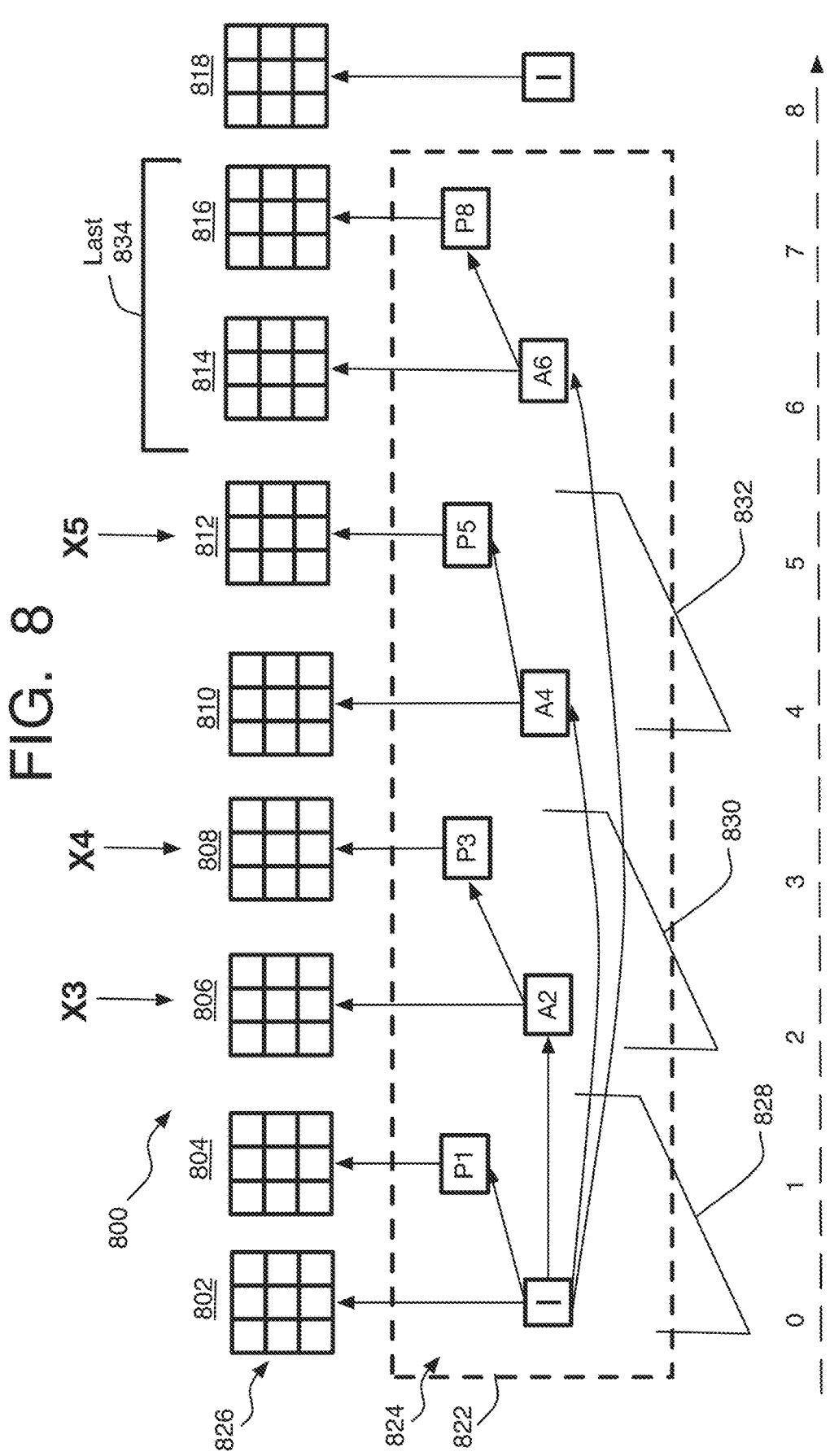
FIG. 8 is a schematic diagram of another example GOP-size-modifying frame structure of an example bitstream used with at least one of the implementations herein.

Referring to FIG. 8 for another example, for even shorter latency by using anchor frames and sub-GOPs, a frame structure 800 has multiple anchor frames in one GOP, and the anchor frames are established at an interval of two (every other frame is an anchor frame). The structure 800 is similar to structure 700 except for the additional anchor frames. Three anchor frames A2, A4, and A6 are placed in one GOP 824 of size 8 and four sub-GOPs 828, 830, 832, and 834 are formed. Switch indictor time points X3, X4, and X5 are shown as well. According to the algorithm (1) recited above, when the switch indicator time point X3 is the same as, or close to, an anchor frame A2 (either exactly or within a +/−½ or ¼ time or clock count of the time line of the source bitstream for one example), the I-frame and anchor A2 of sub-GOP 830 will start the output bitstream to a current client. If a switch indicator time point X4 is at a non-anchor frame (here P3), then the I-frame and the next anchor frame A4 and subsequent frames are to form the output bitstream. When the switch indicator time point X5 is just before the last sub-GOP 834 of the GOP 824 (or within the last sub-GOP 834, then the last sub-GOP 834 is omitted and the I-frame of frame 818 of the next GOP will start the output bitstream instead.

By this structure, the maximum session startup latency (or content or viewport switch interactive latency) only has one frame interval and the average latency is about 0.5 as shown on the following chart:

| Client joins at time X | Session startup latency (W/out Anchor Frames Sub-GOP) | Session startup latency (With Anchor frame and Sub-GOP) |
|---|---|---|
| 0 | 0 | 0 |
| 1 | 7 | 1 |
| 2 | 6 | 0 |
| 3 | 5 | 1 |
| 4 | 4 | 0 |
| 5 | 3 | 1 |
| 6 | 2 | 0 |
| 7 | 1 | 1 |
| 8 | 0 | 0 |
| Average: | 4 (frame intervals) | 0.5 (frame intervals) |

Without anchor frames, the latency can be considered a uniform distribution within the range of [0, GOP_size −1], and the average time (T) AT of a channel switch or a session joining session startup to reach any frames depends on a size of GOP—fps in frames per second:

$$AT = (1000 \text{ ms}/fps) \times (\text{GOP\_size}/2) \quad (2)$$

With anchor frames, the latency can be considered a uniform distribution within the range of [0, sub-GOP_size −1], and the average time (AT') of a channel switch or session joining session startup depends on a size of the sub-GOP:

$$AT' = 1000 \text{ ms}/fps \times (sub\text{–GOP\_size}/2) \quad (3)$$

It will be appreciated that equations (2) and (3) also apply to viewport switches.

The frame selection operation 404 then may include "select first I-frame and anchor frame" 418, where the frames determined by algorithm (1) are selected. The selected frame identifiers then may be provided to the repackaging unit directly or to a tile selector unit when so provided.

Thus, process 400 may include "select tiles for frames" 420. When the distribution server is performing rewriting to provide viewport-based bitstreams, the tiles for the selected frames, and frames subsequent to the selected frames, are determined by the tile selection processes described above. This may include selecting only those tiles for the enhancement layer of a frame that are needed to form an FOV as received by the client. In this case, just the base or low resolution I-frame may be packed when a multiple layer frame structure is used and an anchor frame is being used to start an output bitstream for a switch as described herein. Thus, the FOV tiles for the I-frame may not be determined in this case when the I-frame is merely being transmitted as a reference frame for the anchor frame. Alternatively, it will be appreciated that the anchor frames and sub-GOPs can be used with conventional use cases such as flat 2D video live broadcasting. In this case, the tile selection process may be skipped when tile selection is not being used (although it still could be used with 2D images.

Process 400 may include "repackage selected frames including frames subsequent to selected anchor frame" 422. Thus, the selected frames (the first I-frame and the anchor frame of a sub-GOP) and then the subsequent frames are repackaged by placing the selected tiles in the enhancement layers of the frames to be packed. By one form, this is performed by known packaging techniques and is not limited to a specific technique.

Process 400 may include "transmit output bitstream(s)" 424, where the repackaged bitstream is then transmitted to the client as described above.

While implementation of the example processes 200, 300, and 400 discussed herein may include the undertaking of all operations shown in the order illustrated, the present disclosure is not limited in this regard and, in various examples, implementation of the example processes herein may include only a subset of the operations shown, operations performed in a different order than illustrated, or additional or less operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 9:
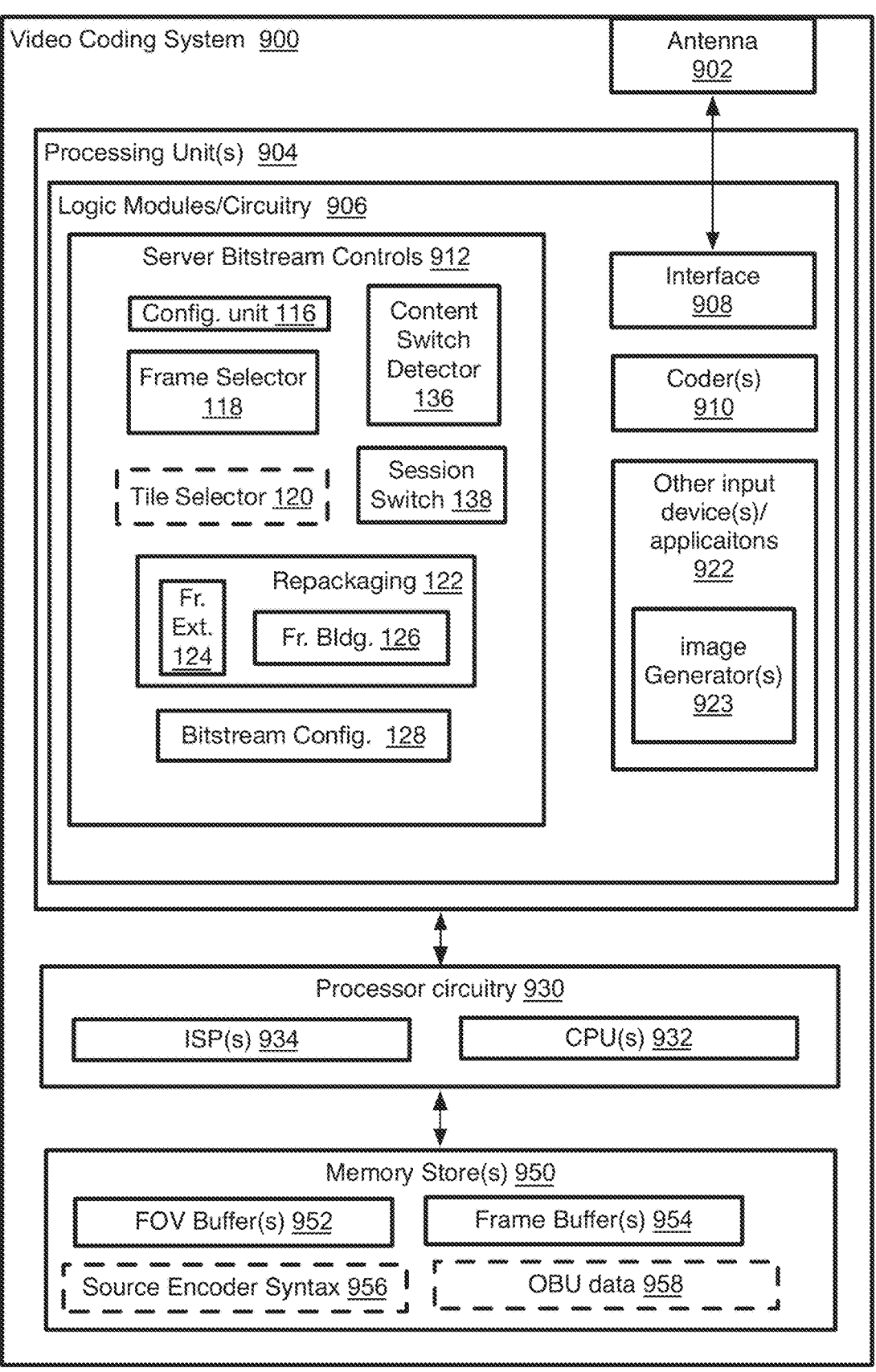
FIG. 9 is a schematic diagram of an example system.

Referring to FIG. 9, an illustrative diagram of an example image processing system or device 900 for video coding is arranged in accordance with at least some implementations of the present disclosure. The system 900 may be a distribution server, such as any one of servers 104 and 104a to 104b in systems 100 or 101 (FIGS. 1A-1B), or may have the server 104 or 104a to 104b. One system 900 may be provided or many systems 900, or system 900 may have one or multiple distribution servers as disclosed herein.

System 900 may include processor circuitry 930 with at least one CPU (or CPU circuitry) 932 and at least one GPU and/or ISP circuitry 934, processing units 904 formed of hardware, firmware, software or any combination thereof, and a memory store(s) 950. The processing units 904 may have logic modules or circuitry 906 that may have server bitstream controls that may be a distribution server (or server circuitry) 912 that is the same or similar to the other distribution servers described herein.

The logic circuitry 906 also may have an interface 908 that receives or transmits video or image-related data such as the bitstreams mentioned herein as well as any other data, and via an antenna 902. This may provide wireless transmissions, wired transmissions, or both.

The logic circuitry 906 also may have coders 910 including an encoder, decoder, or both. An encoder and other input device(s)/applications 922, such as image generator(s) 923, may be provided by logic circuitry 906 when a single site or distribution server also originates or generates the images to be used. Thus, this may include computer-originated image drawing applications or animators, 2D or 3D model constructers, image projectors, and so forth, one or more cameras or image capture devices as well as image modification applications to handle raw image data, and so forth.

The server bitstream controls (or distribution server) 912 may include all or any of the units, component, or modules of the distribution server 104 or any distribution server described above for example, and in order to perform at least frame selection for sub-GOP encoding and/or bitstream rewriting. The distribution server 912 also can perform the random tile selection and/or use two layer structure with no inter-prediction at the enhancement layer as described above. Thus, the server 912 may include the configuration unit 116, frame selector 118, optionally the tile selector 120, the repackaging unit 122, with the frame extraction unit 124 and frame building unit 126, a bitstream configuration unit 128, and depending on the bitstream content being handled, either the content switch detector unit 136, the session switch unit 138, or both. The details and operation of these components to perform the disclosed methods and operate the disclosed systems as suggested by the labels of the units are described above in any of the disclosed systems or methods.

The memory store(s) 950 may store any of the image-related data or instructions as described herein. By one form, the memory 950 may include one or more FOV buffers 952 to store FOV parameters, a frame buffer 954 to store I-frames being held in case they are needed as reference frames for an anchor frame. By one form, the frame buffer is only provided for this purpose with I-frames. The memory 950 also may have a source encoder syntax buffer 956 to hold syntax to transmit to the encoder providing a source bitstream. This may be provided to any encoder providing source bitstream image data. Likewise, an OBU buffer 958 may be provided to hold OBU-related data to set syntax in the output bitstream being provided to the client device. Memory 950 may be implemented as a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). Additionally or alternatively, memory 950 may be implemented by one or more double data rate (DDR) memories, such as DDR, DDR2, DDR3, DDR4, mobile DDR (mDDR), etc. The memory 950 may additionally or alternatively be implemented by one or more mass storage devices such as hard disk drive(s), compact disk (CD) drive(s), digital versatile disk (DVD) drive(s), solid-state disk drive(s), etc. While in the illustrated examples may show a single memory, the memory may be implemented by any number and/or type(s) of datastores, databases, buffers, and so forth. Furthermore, the data stored in the memory 950 may be in any data format such as, for example, binary data, comma delimited data, tab delimited data, structured query language (SQL) structures, etc.

Processor circuitry 930 may include any number and type of central, video, rendering, encoding, image, or graphics processing units that may provide the processors to perform at least the operations as discussed herein. Processor circuitry 930 may provide firmware or hardware, and operate software, or any combination thereof, and may have programmable logic or circuitry such as a logic core or cores that may provide a wide array of programmable logic functions. In an implementation, processor(s) may include dedicated hardware such as fixed function circuitry. Fixed function circuitry may include dedicated logic or circuitry and may provide a set of fixed function entry points that may map to the dedicated logic for a fixed purpose or function.

By one form, the circuitry forming the distribution server 912 and for any of the distribution servers described herein may be implemented by machine executable instructions such as that implemented by any of the units or modules of the distribution server described herein, and which may be implemented by the processor circuitry 930, and/or the Field Programmable Gate Array (FPGA) circuitry. In other examples, the server circuitry 912 is implemented by other hardware logic circuitry, hardware implemented state machines, and/or any other combination of hardware, software, and/or firmware. For example, the server circuitry 912 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bitstream multiplexer or de-multiplexer modules and the like that have not been depicted in the interest of clarity.

Figure 10:
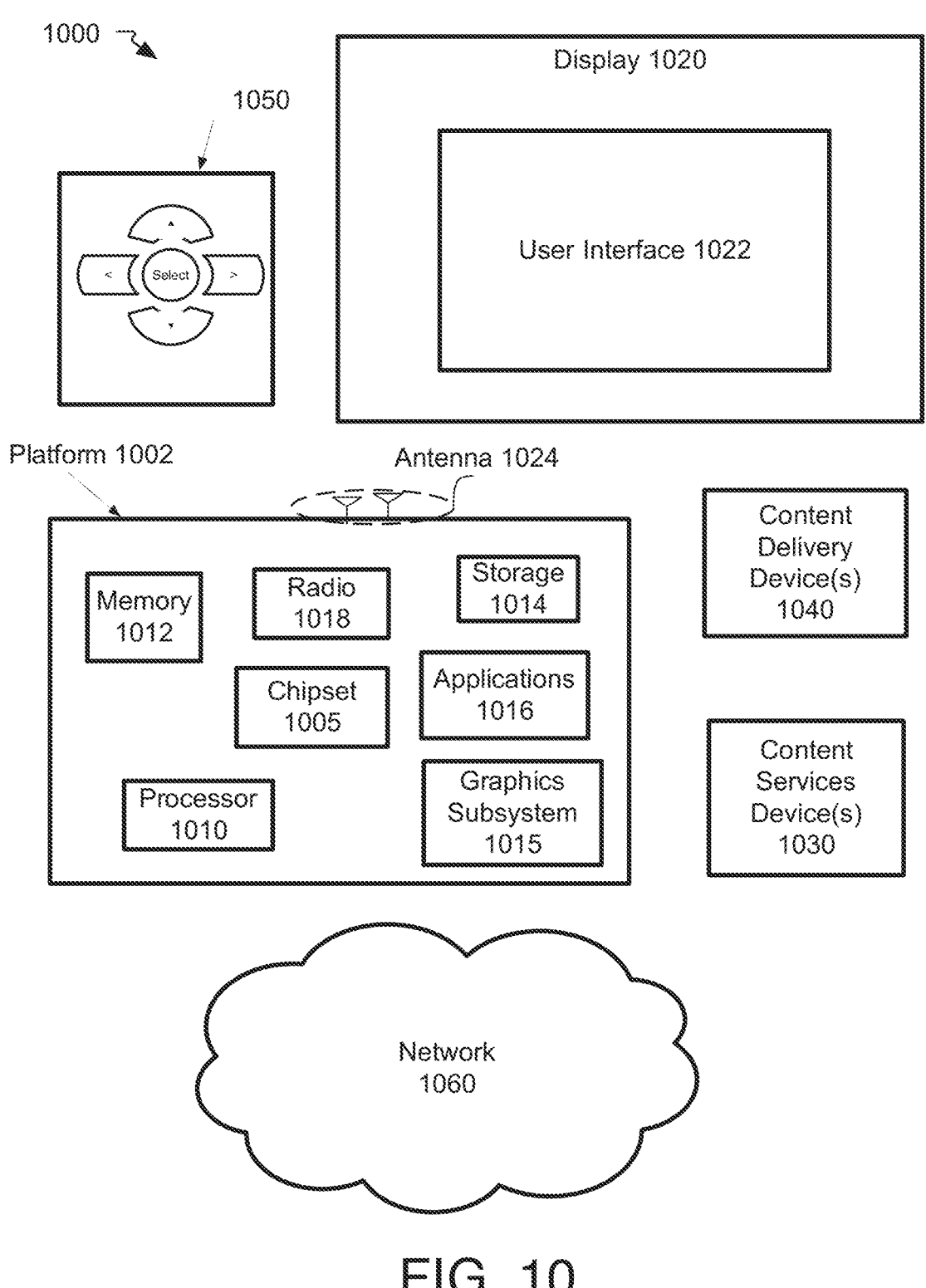
FIG. 10 is a schematic diagram of another example system, all arranged in accordance with at least some of the implementations of the present disclosure.

FIG. 10 is an illustrative diagram of an example system 1000, arranged in accordance with at least some implementations of the present disclosure, and may be any of systems 100 or 900 and may operate any of processes 200, 300, or 400, described above with any of frame structures 500, 600, 700, or 800 described above. In various implementations, system 1000 may be a server, cloud server, internet server, networked computer, or such networked computing device. By other implementations, system 1000 may be a mobile system and may be, or may be part of, the client or the distribution server described herein. For example, system 1000 may be incorporated into a headset, HMD, smart eye glasses, personal computer (PC), laptop computer, ultra-laptop computer, tablet, touch pad, portable computer, hand-held computer, palmtop computer, personal digital assistant (PDA), cellular telephone, combination cellular telephone/ PDA, television, other smart device (e.g., smart phone, smart tablet or smart television), mobile internet device (MID), messaging device, data communication device, cameras, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1024, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any head mounted display, television type monitor, or any other display. Display 1020 may include, for example, a headset or HMD, but otherwise any computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various implementations, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In one form, the navigation controller 1050 is the device itself, such as an HMD, such that circuitry of the navigation controller 1050 senses motion of the HMD as the motion features. In various implementations, the navigation features may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 10.1 surround sound audio, for example. Drivers may include a graphics driver for integrated graphics platforms. In various implementations, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words that are provided for an automated system. For example, control information may be used to route media information through a system, or instruct a node to process the media information in a predetermined manner. The implementations, however, are not limited to the elements or in the context shown or described in FIG. 10.

As described above, system 100 may be embodied in varying physical styles or form factors and the client device 150 (FIG. 1) may be or have a head mounted display 150, such as VR goggles or eye-wear. The client device 150 may be other small form factors or other devices as well, arranged in accordance with at least some implementations of the present disclosure. In some examples, system 800 or 900 may be considered to include client device 150. In various implementations, client device 150 may be implemented as a networked computer and/or mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context. The device 150 may include any of those parts or components found on an HMD, other mobile device, such as smart phones, or any other device that can display a viewport or otherwise display images from the server 104.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By an example one or more first implementations, a computer-implemented method of image processing comprises receiving a first bitstream of a video sequence of encoded frames and encoded by using groups of pictures (GOPs), wherein individual GOPs have no inter-prediction frame dependencies to other GOPs, and wherein individual GOPs each have at least one sub-GOP with no inter-prediction dependencies to frames of another sub-GOP in the same GOP and that depend from a first I-frame of the GOP; and selecting the encoded frames of a current GOP to be packed into a second bitstream to transmit the second bitstream to a remote device and comprising omitting the packing of frames from the first bitstream between the first I-frame of the current GOP and a selected sub-GOP of the current GOP.

By one or more second implementations, and further to the first implementation, wherein each sub-group begins with an anchor frame that is not an I-frame.

By one or more third implementations, and further to the second implementation, wherein the method comprising arranging an encoder providing the first bitstream to place anchor frames along a sequence of frames in a GOP to shorten the delay to begin transmitting the second bitstream to the remote device.

By one or more fourth implementations, and further to the second or third implementation, wherein the method comprising packing the first I-frame and then an anchor frame of the selected sub-group immediately after the first I-frame as the first two frames of the second bitstream.

By one or more fifth implementations, and further to any of the second to fourth implementation, wherein each nth frame in the GOP is preset as an anchor frame at the encoder.

By one or more sixth implementations, and further to any of the second to fifth implementation, wherein each anchor frame of each sub-group in a GOP depends only from the first I-frame of the GOP.

By one or more seventh implementations, and further to any of the second to sixth implementation, wherein the frames forming individual sub-GOPs are a sequence of P-frames.

By one or more eighth implementations, and further to the seventh implementation, wherein the P-frames each depend on a previous P-frame in the sub-GOP with a first non-anchor P-frame depending on the anchor frame being the first frame of the sub-GOP.

By one or more ninth implementations, and further to the seventh implementation, wherein every other frame in a sub-GOP is an anchor frame.

By an example one or more tenth implementations, at least one non-transitory computer-readable medium comprising a plurality of instructions that, in response to being executed on a computing device, cause the computing device to operate by receiving an encoded first bitstream of a video sequence of encoded frames and encoded by using groups of pictures (GOPs), wherein individual GOPs have no inter-prediction frame dependencies to other GOPs, and wherein individual GOPs each have at least one sub-GOP with no inter-prediction dependencies to frames of another sub-GOP in the same GOP and that depend from a first I-frame of the GOP; and selecting the encoded frames of a current GOP to be packed into a second bitstream to transmit the second bitstream to a remote device and comprising omitting the packing of frames from the first bitstream between the first I-frame of the current GOP and a selected sub-GOP of the current GOP.

By one or more eleventh implementations, and further to the tenth implementation, wherein the individual sub-GOPs have a first frame that is an anchor frame, is not an I-frame, and only directly depends on the first I-frame within the same GOP.

By one or more twelfth implementations, and further to the eleventh implementation, wherein the instructions cause the computing device to operate by determining the selected sub-GOP comprising selecting the next available sub-GOP of a next available anchor frame after receiving a switch indicator that content of the second bitstream is requested by the remote device.

By one or more thirteenth implementations, and further to the twelfth implementation, wherein the switch indicator is (1) associated with a request from the remote device to join a session of the first bitstream or (2) associated with a switch of broadcast channels to a channel to be transmitted to the remote device rather than a previous channel being transmitted to the remote device.

By one or more fourteenth implementations, and further to the twelfth implementation, wherein determining the selected sub-GOP comprises selecting the next available sub-GOP after receiving a switch indicator that a received field of view from the remote device has moved at least partly off of a full image provided by the first bitstream.

By one or more fifteenth implementations, and further to any of the twelfth to fourteenth implementation, wherein determining the selected sub-GOP comprises selecting a sub-GOP of a current anchor frame when a switch indicator time point is set at or close to or before a time point of the current anchor frame in or based on the first bitstream.

By one or more sixteenth implementations, and further to any of the twelfth to fourteenth implementation, wherein the method comprising providing an I-frame of a next GOP as a start of the second bitstream when a switch indicator time point is set after all anchor frames except a last anchor frame of a last sub-GOP in the current GOP or after the last anchor frame in the current GOP.

By one or more seventeenth implementations, and further to the eleventh implementation, wherein the anchor frames are formed as part of a base layer of the frames of the first and second bitstreams, and wherein the first and second bitstreams have at least one enhancement layer at individual frames of the first and second bitstreams, wherein the frames at the enhancement layers depend from the base layer frames and not to other enhancement layer frames, and wherein the enhancement layers each are free to have tiles of a full image provided by the base layer that are different than the tiles of the full image of any other enhancement layer of a different frame.

By an example one or more eighteenth implementations, A computer-implemented system comprising: memory to store data associated with the first and second bitstreams; and processor circuitry forming at least one processor communicatively coupled to the memory and being arranged to operate by receiving an encoded first bitstream of a video sequence of encoded frames and encoded by using groups of pictures (GOPs), wherein individual GOPs have no inter-prediction frame dependencies to other GOPs, and wherein individual GOPs each have at least one sub-GOP with no inter-prediction dependencies to frames of another sub-GOP in the same GOP and that depend from a first I-frame of the GOP; and selecting the encoded frames of a current GOP to be packed into a second bitstream to transmit the second bitstream to a remote device and comprising omitting the packing of frames from the first bitstream between the first I-frame of the current GOP and a selected sub-GOP of the current GOP.

By one or more nineteenth implementations, and further to the eighteenth implementation, wherein the at least one processor is to use the first bitstream to construct multiple second bitstreams each being constructed with a separate selection of sub-GOPs.

By one or more twentieth implementations, and further to the eighteenth or nineteenth implementation, wherein the individual sub-GOPs have a first frame that is an anchor frame, is not an I-frame, and only directly depends on the first I-frame within the same GOP.

By one or more twenty-first implementations, and further to the twentieth implementation, wherein the first I-frame and an anchor frame of the selected sub-GOP are the first two frames of the second bitstream, wherein the first I-frame is used as a reference frame of the anchor frame and is not to be displayed at the remote device.

By one or more twenty-second implementations, and further to the twentieth or twenty-first implementation, wherein the first and second bitstreams have frames provided in a base layer and at least one enhancement layer in a higher resolution then the base layer, and wherein only the base layer of the first I-frame is provided in the second bitstream.

By one or more twenty-third implementations, and further to any one of the twentieth to twenty-second implementation, wherein the first I-frame is held in a buffer in case the first I-frame is needed as a reference frame for an anchor frame in the second bitstream.

By one or more twenty-fourth implementations, and further to any of the eighteenth to twenty-third implementation, wherein determining the selected sub-GOP comprises selecting a sub-GOP of a current anchor frame when a switch indicator time point is set at or close to or before a time point of the current anchor frame in or based on the first bitstream.

By one or more twenty-fifth implementations, and further to any of the eighteenth to twenty-fourth implementation, wherein the method comprising providing an I-frame of a next GOP as a start of the second bitstream when a switch indicator time point is set after all anchor frames except a last anchor frame of a last sub-GOP in the current GOP or after the last anchor frame in the current GOP.

In one or more twenty-sixth implementations, a device, apparatus, or system includes means to perform a method according to any one of the above implementations.

In one or more twenty-seventh implementations, at least one machine readable medium includes a plurality of instructions that in response to being executed on a computing device, cause the computing device to perform a method according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. An apparatus comprising:
memory;
computer readable instructions; and
at least one processor circuit to be programmed based on the computer readable instructions to:
access a first bitstream of a video sequence of encoded frames provided in a base layer and at least one enhancement layer of the first bitstream, the at least one enhancement layer having a higher resolution than the base layer, the encoded frames corresponding to groups of pictures, an individual group of pictures (GOP) of the groups of pictures (GOPs) to have no inter-prediction frame dependencies to other GOPs, and the individual GOP to have at least one sub-GOP that (i) has no inter-prediction dependencies to frames of another sub-GOP in the individual GOP, (ii) depends from a first I-frame of the GOP, and (iii) begins with an anchor frame that is not an I-frame; and
select the encoded frames of a current GOP to be packed into a second bitstream to be transmitted to a remote device, the second bitstream having frames provided in a base layer and at least one enhancement layer of the second bitstream, the selection to omit the encoded frames from the first bitstream between the first I-frame of the current GOP and a selected sub-GOP of the current GOP, the base layer of the first I-frame in the second bitstream.

2. The apparatus of claim 1, wherein one or more of the at least one processor circuit is to use the first bitstream to construct multiple second bitstreams based on separate selections of sub-GOPs.

3. The apparatus of claim 1, wherein the anchor frame of the at least one sub-GOP directly depends on the first I-frame within the individual GOP.

4. The apparatus of claim 1, wherein the first I-frame and an anchor frame of the selected sub-GOP are a first two frames of the second bitstream, and the first I-frame (i) is used as a reference frame of the anchor frame and (ii) is not to be displayed at the remote device.

5. The apparatus of claim 1, wherein the first I-frame is held in a buffer to be available as a reference frame for an anchor frame in the second bitstream.

6. A computer-implemented method comprising:

accessing a first bitstream of a video sequence of encoded frames, the encoded frames based on groups of pictures, an individual group of pictures (GOP) of the groups of pictures (GOPs) having no inter-prediction frame dependencies to other GOPs, and the individual GOP having at least one sub-GOP that has (i) no inter-prediction dependencies to frames of another sub-GOP in the individual GOP, (ii) depends from a first I-frame of the GOP, and (iii) begins with an anchor frame that is not an I-frame; and selecting the encoded frames of a current GOP to be packed into a second bitstream to be transmitted to a remote device, the selecting to omit the encoded frames from the first bitstream between the first I-frame of the current GOP and a selected sub-GOP of the current GOP, the first I-frame and an anchor frame of the selected sub-GOP to be a first two frames of the second bitstream, and the first I-frame (i) is to be used as a reference frame of the anchor frame and (ii) is not to be displayed at the remote device.

7. The method of claim 6, including arranging causing an encoder providing the first bitstream to place anchor frames along a sequence of frames in the individual GOP to shorten a delay to begin transmitting the second bitstream to the remote device.

8. The method of claim 6, wherein nth frames in the individual GOP are preset as anchor frames.

9. The method of claim 6, wherein the anchor frame of the at least one sub-GOP depends from the first I-frame of the individual GOP.

10. The method of claim 6, wherein ones of the frames forming sub-GOPs of the individual GOP are corresponding sequences of P-frames.

11. The method of claim 10, wherein the P-frames of the at least one sub-GOP depend on a previous P-frame in the at least one sub-GOP with a first non-anchor P-frame of the least one sub-GOP depending on the anchor frame of the at least one sub-GOP.

12. The method of claim 10, wherein the individual GOP includes anchor frames at intervals of two frames.

13. At least one non-transitory computer-readable medium comprising instructions to cause a computing device to at least:

access a first bitstream of a video sequence of encoded frames provided in a base layer and at least one enhancement layer of the first bitstream, the at least one enhancement layer having a higher resolution than the base layer, the encoded frames based on groups of pictures, an individual group of pictures (GOP) of the groups of pictures (GOPs) to have no inter-prediction frame dependencies to other GOPs, and the individual GOP to have at least one sub-GOP that (i) has no inter-prediction dependencies to frames of another sub-GOP in the individual GOP, (ii) depends from a first I-frame of the GOP, and (iii) begins with an anchor frame that is not an I-frame; and select the encoded frames of a current GOP to be packed into a second bitstream to be transmitted to a remote device, the second bitstream having frames provided in a base layer and at least one enhancement layer of the second bitstream, the selection to omit the encoded frames from the first bitstream between the first I-frame of the current GOP and a selected sub-GOP of the current GOP, the base layer of the first I-frame in the second bitstream.

14. The at least one non-transitory computer-readable medium of claim 13, wherein the anchor frame of the at least one sub-GOP directly depends on the first I-frame within the individual GOP.

15. The at least one non-transitory computer-readable medium of claim 13, wherein the instructions are to cause the computing device to determine the selected sub-GOP by selecting a next available sub-GOP associated with a next available anchor frame after obtaining a switch indicator that indicates content of the second bitstream is requested by the remote device.

16. The at least one non-transitory computer-readable medium of claim 15, wherein the switch indicator is at least one of (1) associated with a request from the remote device to join a session of the first bitstream or (2) associated with a switch to a broadcast channel to be transmitted to the remote device, the broadcast channel different from a previous channel being transmitted to the remote device.

17. The at least one non-transitory computer-readable medium of claim 13, wherein the instructions are to cause the computing device to determine the selected sub-GOP by selecting a next available sub-GOP after obtaining a switch indicator that indicates a received field of view from the remote device has moved at least partly off of a full image provided by the first bitstream.

* * * * *